United States Patent [19]
Chew

[11] Patent Number: 5,678,034
[45] Date of Patent: Oct. 14, 1997

[54] ACCESSBAR ARBITER

[75] Inventor: Chee Heng Chew, Redmond, Wash.

[73] Assignee: Microsoft Corporation, Redmond, Wash.

[21] Appl. No.: 733,522

[22] Filed: Oct. 18, 1996

Related U.S. Application Data

[63] Continuation of Ser. No. 468,653, Jun. 6, 1995.
[51] Int. Cl.$^6$ ............................................. G06F 15/00
[52] U.S. Cl. ........................................................ 395/511
[58] Field of Search .................................. 395/359, 511, 395/512, 135; 345/185

[56] References Cited

U.S. PATENT DOCUMENTS

| | | | |
|---|---|---|---|
| 5,424,966 | 6/1995 | Hirayama | 364/709.16 |
| 5,502,808 | 3/1996 | Goddard et al. | 395/511 |

*Primary Examiner*—Phu K. Nguyen
*Attorney, Agent, or Firm*—Seed and Berry LLP

[57] ABSTRACT

Described herein is an accessbar arbiter that resolves conflicting requests from screen objects for locations on a video display. In addition, the accessbar arbiter governs the behavior of screen objects so as to prevent one screen object from negatively affecting another screen object. An example of these screen objects includes accessbars. An accessbar is a consistently visible user interface dement that provides a user with access to computer programs. In a computer system, accessbars are typically anchored at the edge of the display and there is no limit to the number of accessbars that can appear on the display at a given time, thus problems may arise. For example, more than one accessbar may wish to be displayed at a given location. In addition, the functionality of one accessbar may affect the processing of other accessbars. Thus, for the accessbars displayed on a computer display to operate together, a centralized mechanism for governing accessbars' location and behavior is desirable. The system described herein provides such a mechanism, known as an accessbar arbiter. The system described herein governs accessbars' location by receiving requests for proposed locations and by granting the requests if the proposed locations would not conflict with another accessbar. If such a conflict would occur, the system described herein provides an alternate location. The system described herein governs accessbars' behavior by providing a number of notifications to the accessbars whenever an event occurs that may affect the processing of the accessbars. Such an event includes changes to another accessbar on the same side of the display or the start of a fullscreen application, such as a screen saver.

32 Claims, 18 Drawing Sheets

ACCESSBAR ARBITER

CROSS-REFERENCE TO RELATED APPLICATION

This application is a continuation of U.S. patent application Ser. No. 08/468,653, filed Jun. 6, 1995.

TECHNICAL FIELD

This invention relates generally to data processing systems and, more particularly, to the management of accessbars on a video display of a data processing system.

BACKGROUND OF THE INVENTION

Today's computer systems typically display screen objects on the video display of the computer system. A screen object is a user-visible object displayed on the video display that conveys information to the user. It is common for more than one screen object to be displayed on the video display at a time. Thus, conflicts arise when two screen objects wish to be displayed at the same location on the video display. In conventional computer systems, these conflicts are left unresolved.

There are other types of conflicts that arise between screen objects displayed on a video display. For example, one screen object may perform functionality that can have an effect on another screen object. Such functionality includes when one screen object moves so as to overlap a second screen object, thereby preventing the second screen object from being visible. These conflicts are left unresolved by conventional computer systems.

SUMMARY OF THE INVENTION

An accessbar arbiter is described herein that resolves conflicting requests from screen objects for locations on a video display. In addition, the accessbar arbiter governs the behavior of screen objects so as to prevent one screen object from affecting another screen object. An example of these screen objects includes accessbars. An accessbar is a consistently visible user interface element that provides a user with access to computer programs. In a computer system, accessbars are typically anchored at the edge of the display, and there may be many accessbars that can appear on the display at a given time, thus potential conflicts may arise that require arbitration. For example, more than one accessbar may wish to be displayed at a given location. In addition, the functionality of one accessbar may affect the processing of other accessbars. Thus, for the accessbars displayed on a computer display to operate together, a centralized mechanism for governing accessbars' location and behavior is desirable. The system described herein provides such a mechanism, known as an accessbar arbiter. The system described herein governs accessbars' location by receiving requests for proposed locations and by granting the requests if the proposed locations would not conflict with another accessbar. If such a conflict would occur, the system described herein provides an alternate location. The system described herein governs accessbars' behavior by providing a number of notifications to the accessbars whenever an event occurs that may affect the processing of the accessbars. Such an event includes changes to another accessbar on the same side of the display or the start of a fullscreen application, such as a screen saver.

In accordance with a first aspect of the present invention, a method is practiced in a computer system having a video display for displaying screen objects, a computer program for causing the video display to display one of the screen objects, and an arbiter for determining a location on the video display for the displaying of the screen objects. In accordance with this first aspect of the present invention, a request is received by the arbiter from the computer program containing a proposed location of the screen object on the video display. The arbiter determines whether to display the screen object at the proposed location. When it is determined that the screen object is to be displayed at the proposed location, the computer program displays the screen object at the proposed location on the video display. However, when it is determined that the screen object is not to be displayed at the proposed location, the arbiter determines an alternative location, and the computer program displays the screen object at the alterative location on the video display.

In accordance with a second aspect of the present invention, a data processing system is provided that includes a video display for displaying a plurality of screen objects and a memory. The memory further comprises an arbiter and a computer program. The arbiter has a receive component for receiving a request to display a screen object at a requested location. The arbiter also has a determination component for determining whether to display the screen object at the requested location. Further, the arbiter has a location component for determining an alternative location when the determination component determines not to display the screen object at the requested location and the arbiter has an indication component for returning an indicated location. The indicated location is the requested location when the determination component determines to display the screen object at the requested location. The indicated location is the alterative location when the determination component determines not to display the screen object at the requested location. The computer program sends the request to the arbiter to display the screen object at the requested location, receives the indicated location from the arbiter and causes the video display to display the screen object at the indicated reaction.

DETAILED DESCRIPTION OF THE INVENTION

The preferred embodiment of the present invention utilizes an accessbar arbiter for resolving conflicts between screen objects competing for a location on a video display. In addition, the accessbar arbiter governs the functionality of screen objects to prevent the functionality of one screen object from negatively affecting another screen object. An example of these screen objects includes accessbars. An "accessbar" is a general term that encompasses both taskbars and appbars. A "taskbar" is a consistently visible user interface element that informs a user of which tasks are active and have an active window. An active task is a computer program that is loaded into primary memory. The taskbar is constructed so that it is not obscurable by open windows, unless the user so selects to obscure the taskbar. The taskbar also displays indicators or buttons used for non-minimizing currently active task windows. The taskbar includes a button for each active task. Users merely need to single click on a taskbar button provided for a task to open the task window. These buttons may also be used to switch tasks. The taskbar usually remains anchored at a fixed location on the user interface (see FIG. 2A) which may be changed by a user. The taskbar runs typically as part of the operating system and provides other functionality that is more clearly described in U.S. patent application Ser. No. 08/354,916, entitled "Taskbar With Start Menu," which is hereby incorporated by reference.

An "appbar" shares many of the same characteristics as a taskbar with the exception that an appbar provides access to computer programs that are both loaded into memory as well as not loaded into memory. An appbar serves as a shortcut to run related computer programs. Typically an appbar has a button for each related computer program to which the appbar provides access. These buttons, unlike the comparable taskbar buttons, are permanently visible. For example, a company that develops multiple computer programs may implement an appbar with a button that provides access to each computer program so that users may have easy access to the company's computer programs.

In a computer system, there are usually a number of accessbars that can appear on the display at a given time. Since the accessbars are typically anchored at a fixed location, such as the edge of the display, problems may arise. For example, more than one accessbar may wish to be displayed at a particular location. Thus, the functionality of one accessbar may affect other accessbars. Thus, for the accessbars displayed on a computer display to operate together, a centralized mechanism for governing accessbars' location and behavior is desirable. The preferred embodiment of the present invention provides such a mechanism, known as an accessbar arbiter.

Figure 1:
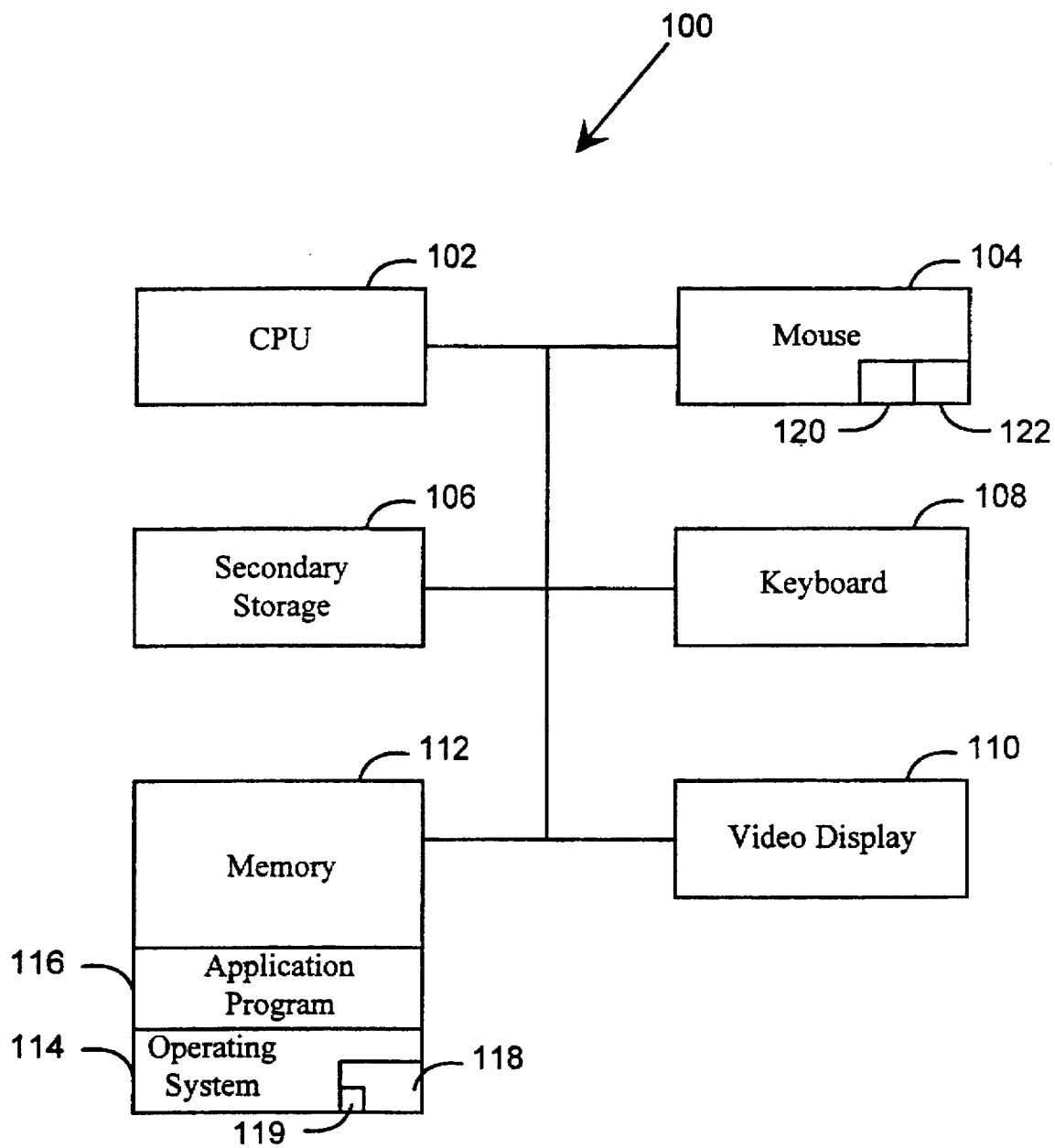
FIG. 1 depicts a computer system suitable for practicing the preferred embodiment of the present invention.

FIG. 1 is a block diagram of a computer system 100 that is suitable for practicing the preferred embodiment of the present invention. The computer system 100 includes a central processing unit (CPU) 102, which has access to several peripheral devices, including a mouse 104, a keyboard 108, and a video display 110. The mouse 104 includes at least a left mouse button 120 and a right mouse button 122. The CPU 102 also has access to memory 112 and secondary storage 106. The memory 112 holds copies of an application program 116 and an operating system 114. The operating system 114 contains the accessbar arbiter 118 of the preferred embodiment of the present invention. The accessbar arbiter 118 provides an application program interface 119 so as to allow access to the arbiter. Those skilled in the art will appreciate that the accessbar arbiter 118 of the present invention is not limited to being part of an operating system; rather, the accessbar arbiter 118 may also be implemented in an application program. For purposes of the discussion below, it is assumed that the operating system 114 is the "MICROSOFT" "WINDOWS" 95 Operating System from Microsoft Corporation. Those skilled in the art will appreciate that the present invention may also be practiced with other operating systems.

Accessbars are typically implemented by either an application program 116 or the operating system 114 as a window. A window is created based upon a window class. The window class identifies a window procedure that processes messages that are sent to the window. The operating system 114 is a message-based operating system such that operations are achieved by passing messages between windows. The operating system 114 supports a RegisterClass() function that enables an application to register window classes. The window procedure is a function that receives and processes messages that are sent to the window.

In order to more fully understand the processing of the accessbar arbiter of the preferred embodiment of the present invention, the functionality of an accessbar requires explanation. Thus, the following description is presented in two parts: first, an overview of the functionality of accessbars is presented and second, the details of the accessbar arbiter are presented.

Accessbar Overview

Figure 2A:
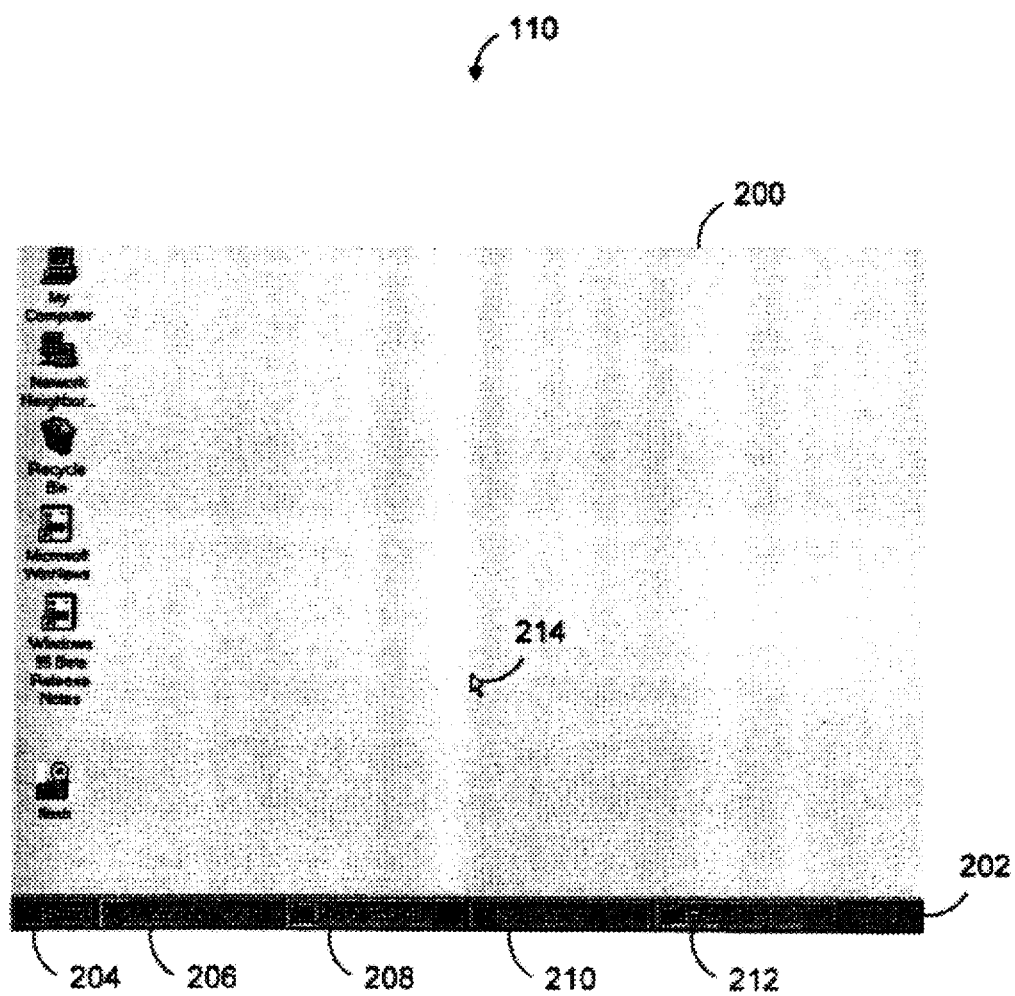
FIG. 2A depicts a taskbar displayed on the video display of the computer system of FIG. 1.
Figure 2B:
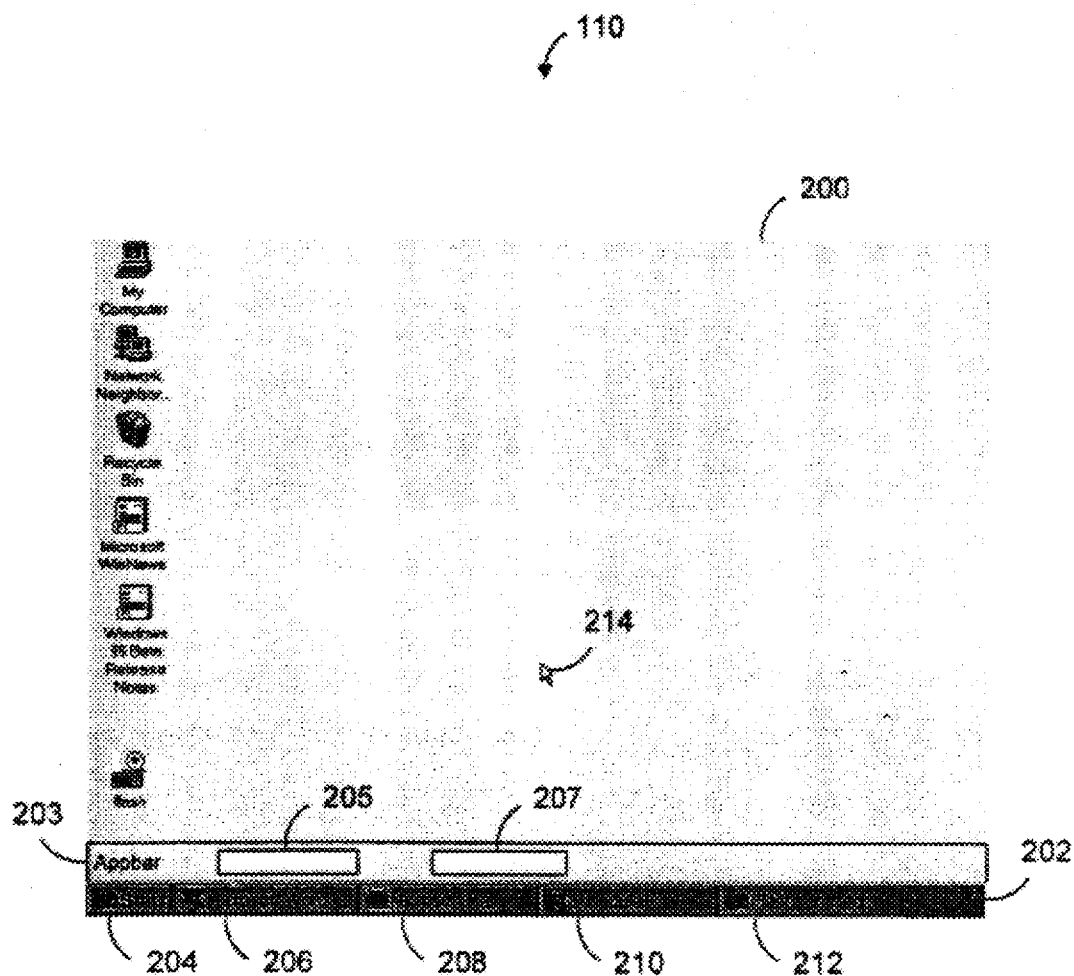
FIG. 2B depicts an appbar displayed with the taskbar of FIG. 2A.
Figure 2C:
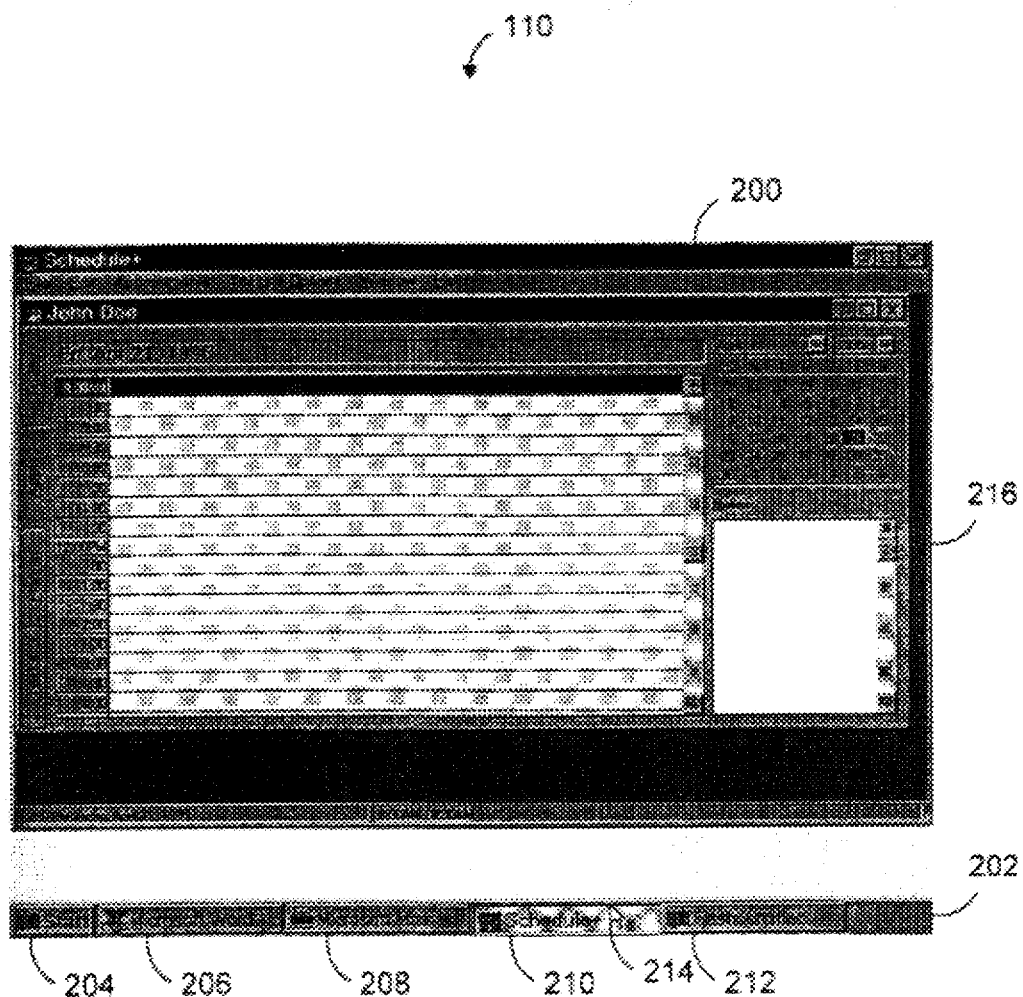
FIG. 2C depicts a window displayed after the invocation of a taskbar button on the taskbar of FIG. 2A.

FIG. 2A depicts an example of the graphical user interface provided by the operating system 114. A taskbar 202 is positioned at the bottom of a virtual desktop 200 on the video display 110. In the example shown in FIG. 2A, the taskbar 202 is a rectangle that extends from the left-hand side (relative to the user) of the video display to the right-hand side of the video display and is anchored to the bottom edge of the video display. The taskbar 202 includes a start menu button 204 that provides access to programs so that the programs may be invoked. The taskbar 202 also indicates the tasks that are active by displaying taskbar buttons such as buttons 206, 208, 210, and 212. A user displays an active task window, for example, from the taskbar 202 of FIG. 2A by positioning a mouse cursor 214 to point at a taskbar button using the mouse or other suitable input device and then single clicking the mouse button to open the window associated with the task to display it in a visible, non-minimized state. For example, FIG. 2C depicts a window 216 displayed in non-minimized form after the user has depressed taskbar button 210 of the taskbar of FIG. 2A. The window 216 displays the user interface of the Schedule+ scheduling program available from Microsoft Corporation. However, with reference to FIG. 2B, on an appbar 203, the buttons 205, 207 refer to both computer programs that are loaded into memory and computer programs that have not been loaded into memory. Thus, clicking on appbar buttons 205, 207 launches the computer program if it has not been loaded into memory and then displays the window associated with the computer program in a non-minimized form, regardless of whether the computer program had been loaded into memory. In the following, the functionality of an accessbar is explained relative to a taskbar, however, it should be appreciated that an appbar performs similar functionality.

Figure 2D:
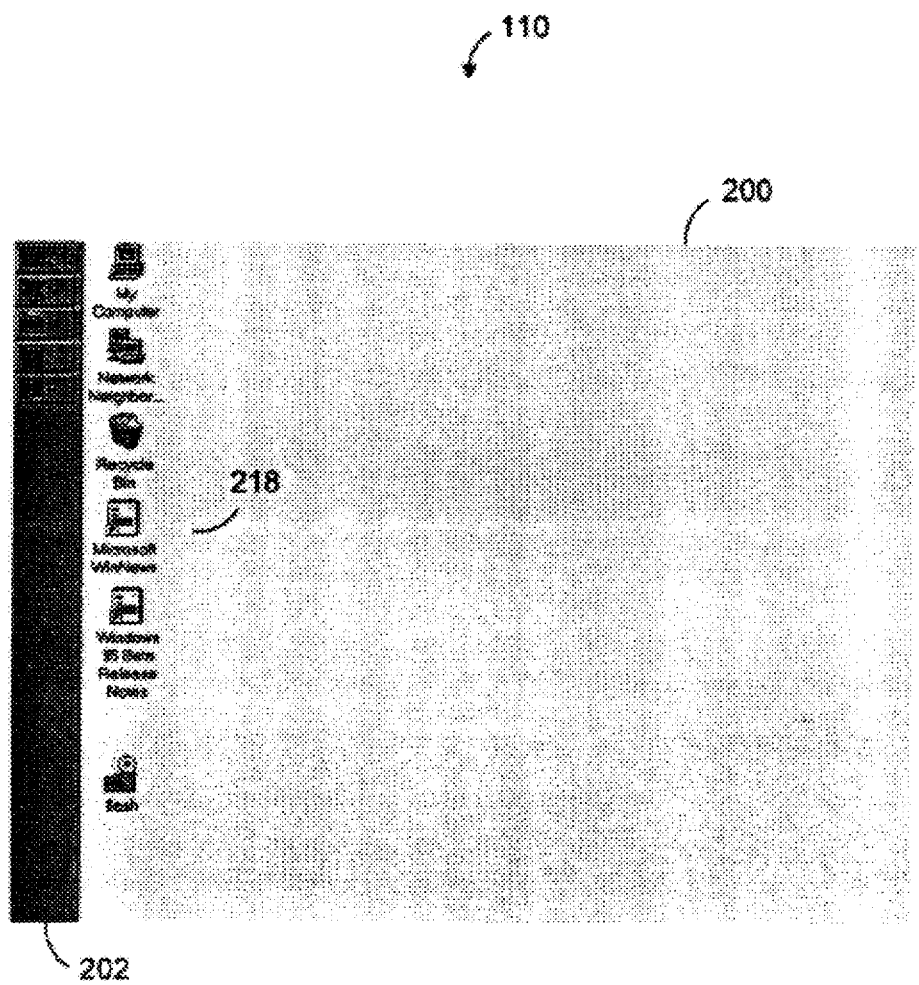
FIG. 2D depicts the movement of the taskbar of FIG. 2A from the bottom edge of the video display to the left-hand side edge (relative to the user) of the video display and the resulting displacement of the icons on the video display from their original location.

As previously stated, although an accessbar is usually anchored to a side of the video display 110, it can be moved to another side of the video display. The movement of an accessbar occurs in response to user input. The type of user input required depends on the implementation of the accessbar. For example, in order to move the taskbar 202 shown in FIG. 2A, the user moves the mouse cursor 214 to refer to a location on the taskbar without a taskbar button, depresses the left mouse button and then moves the mouse to position the mouse cursor near a different edge of the video display 110. FIG. 2D depicts the state of the video display 110 after the mouse button has been released and a move of the taskbar 202 has occurred. In general, when an accessbar has been moved, any screen objects (e.g., windows or icons) 218 currently being displayed within the area to be occupied by the accessbar are moved out of the way of the accessbar in a direction toward the center of the video display. In this manner, the screen objects 218 remain visible and accessible to the user.

Each accessbar on the video display 110 typically has properties associated therewith. These properties can be accessed in a number of ways, such as by clicking the right mouse button when the mouse cursor refers to an area of the accessbar without a taskbar button. Two properties of particular relevance are the "always-on-top" property and the "autohide" property. The always-on-top property refers to the accessbar being placed in a mode where it is always displayed at the top of the Z order. The "Z order" refers to the depth of the screen objects displayed on the video display 110. That is, the video display is typically viewed as a two dimensional plane of points that are referenced using Cartesian coordinates. A third axis, the 'Z' axis, may also be designated that identifies the logical depth of screen objects on the video display. The "Z order" refers to the order of the screen objects along the Z axis. The top of the Z order refers to a screen object that appears closest to the user and is unobstructed by another screen object. Consequently, the bottom of the Z order refers to a screen object that appears furthest away from the user and can be obstructed by many screen objects.

The always-on-top property has a particular effect when a user attempts to resize or move a window on the video display. When attempting to resize a window, the user is prevented from resizing the window so as to encroach upon an area of the video display 110 occupied by an accessbar. In other words, the "work area" of the video display 110 is reduced when an accessbar is displayed in always-on-top mode. When an accessbar is placed in always-on-top mode and a window is moved so as to encroach upon the area occupied by the accessbar, the accessbar is displayed on top of the encroaching window (i.e., at the top of the Z order). Conversely, when an accessbar is not in always-on-top mode, the user may resize the window so that it does overlap the accessbar. Thus, the work area of the video display includes the area of the window occupied by the accessbar. Similarly, when the accessbar is not in always-on-top mode, the user may move the window so that it overlaps the accessbar.

Figure 2E:
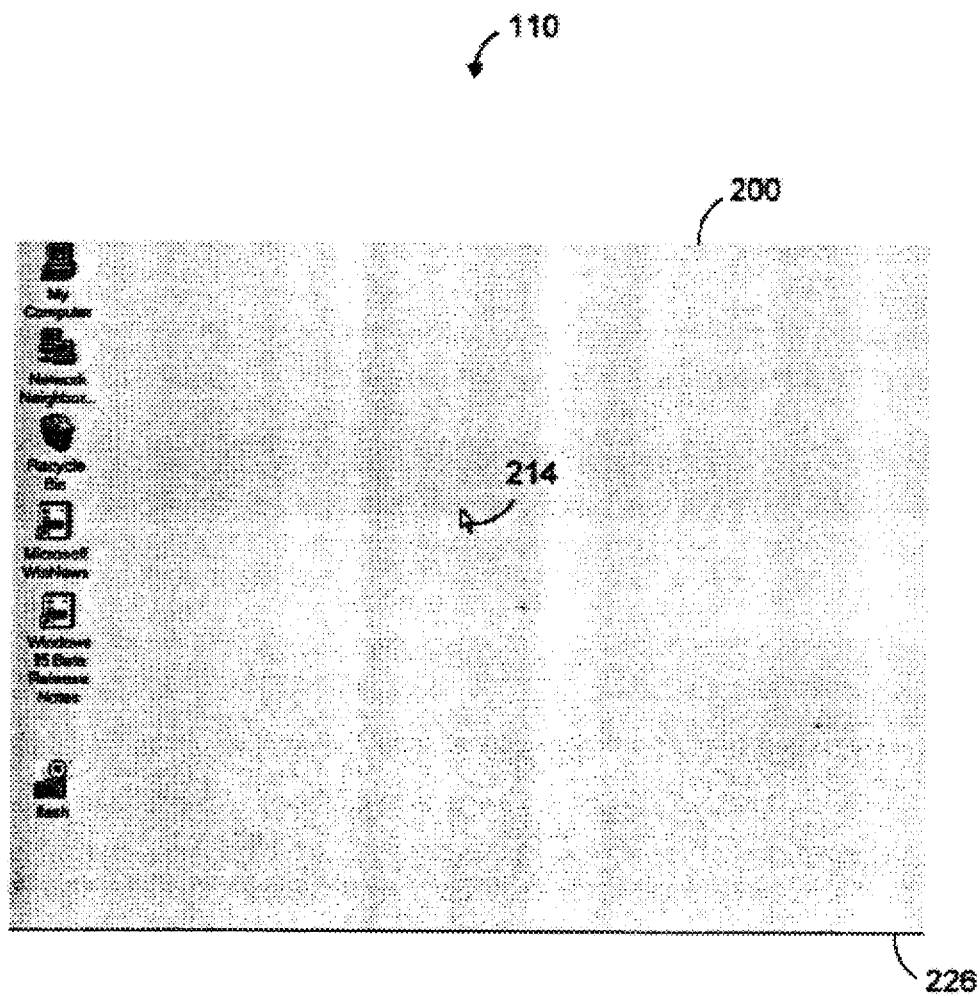
FIG. 2E depicts the taskbar of FIG. 2A as it appears in autohide mode.
Figure 2F:
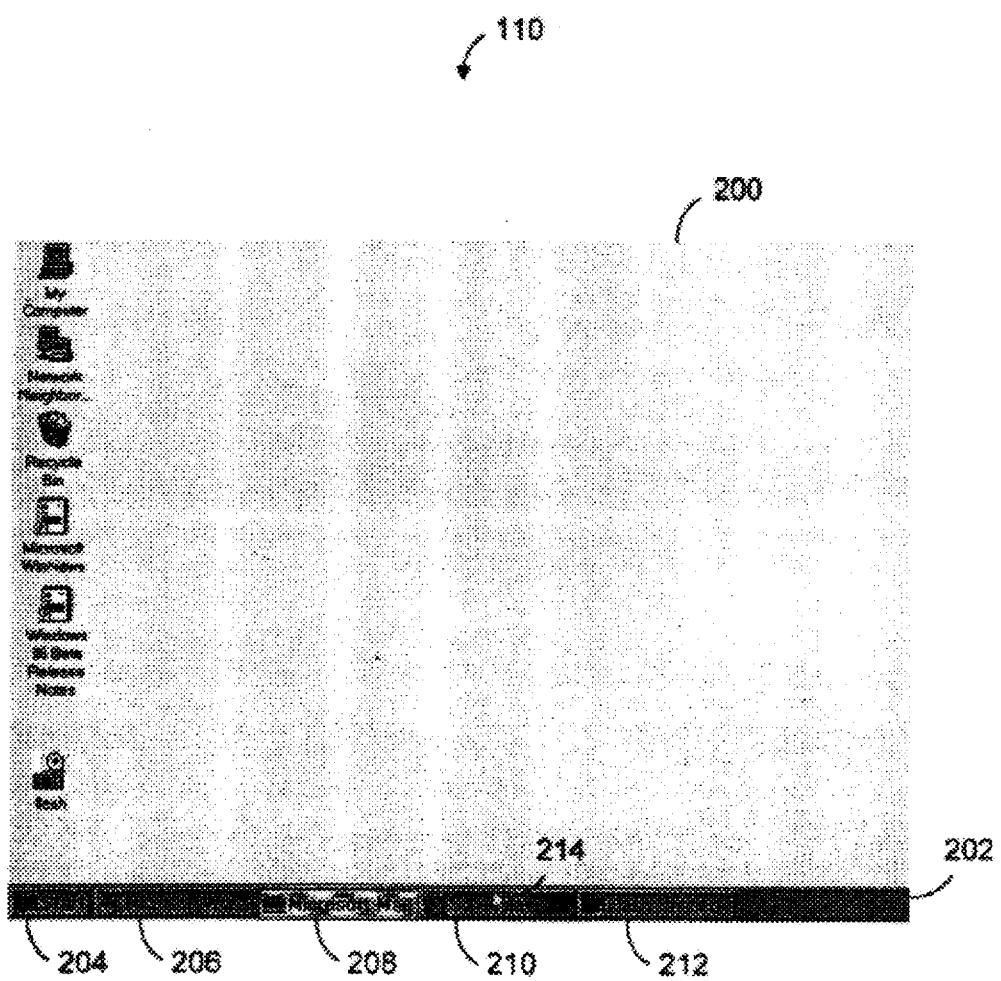
FIG. 2F depicts the displaying of the taskbar of FIG. 2E in autohide mode after the user has touched the hotbar with the mouse cursor.

Autohide mode refers to when an accessbar is initially presented to the user such that the accessbar is invisible, as shown in FIG. 2E. When invisible, instead of displaying the accessbar, a "hotbar" 226 is displayed that is only a couple of pixels in width so that it is barely visible to the user. The hotbar 226 acts as a mechanism for displaying an accessbar in a user visible manner. This is done by moving the mouse cursor 214 so as to touch the hotbar 226 and thereupon (FIG. 2F) the accessbar (e.g., taskbar 202) reappears and becomes visible to the user.

The Accessbar Arbiter

The preferred embodiment of the present invention provides an accessbar arbiter to ensure that accessbars work properly together and work properly in response to outside events, such as when a fullscreen application is invoked. A "fullscreen application" is an application program that takes total control of the video display by displaying information at all portions of the video display. Examples of fullscreen applications include video games as well as screen savers. Thus, when a fullscreen application is invoked, all accessbars should be informed so that they can relinquish control of their area of the display. The accessbar arbiter ensures that accessbars work properly together by acting as a centralized mechanism that centrally manages all accessbars. This centralized management (or arbitration) is facilitated by application programs that display an accessbar sending messages to the accessbar arbiter and by the accessbar arbiter sending notifications to the application programs when an event occurs. The messages, notifications and the events for which the accessbar arbiter sends the notifications are further discussed below.

Figure 3:
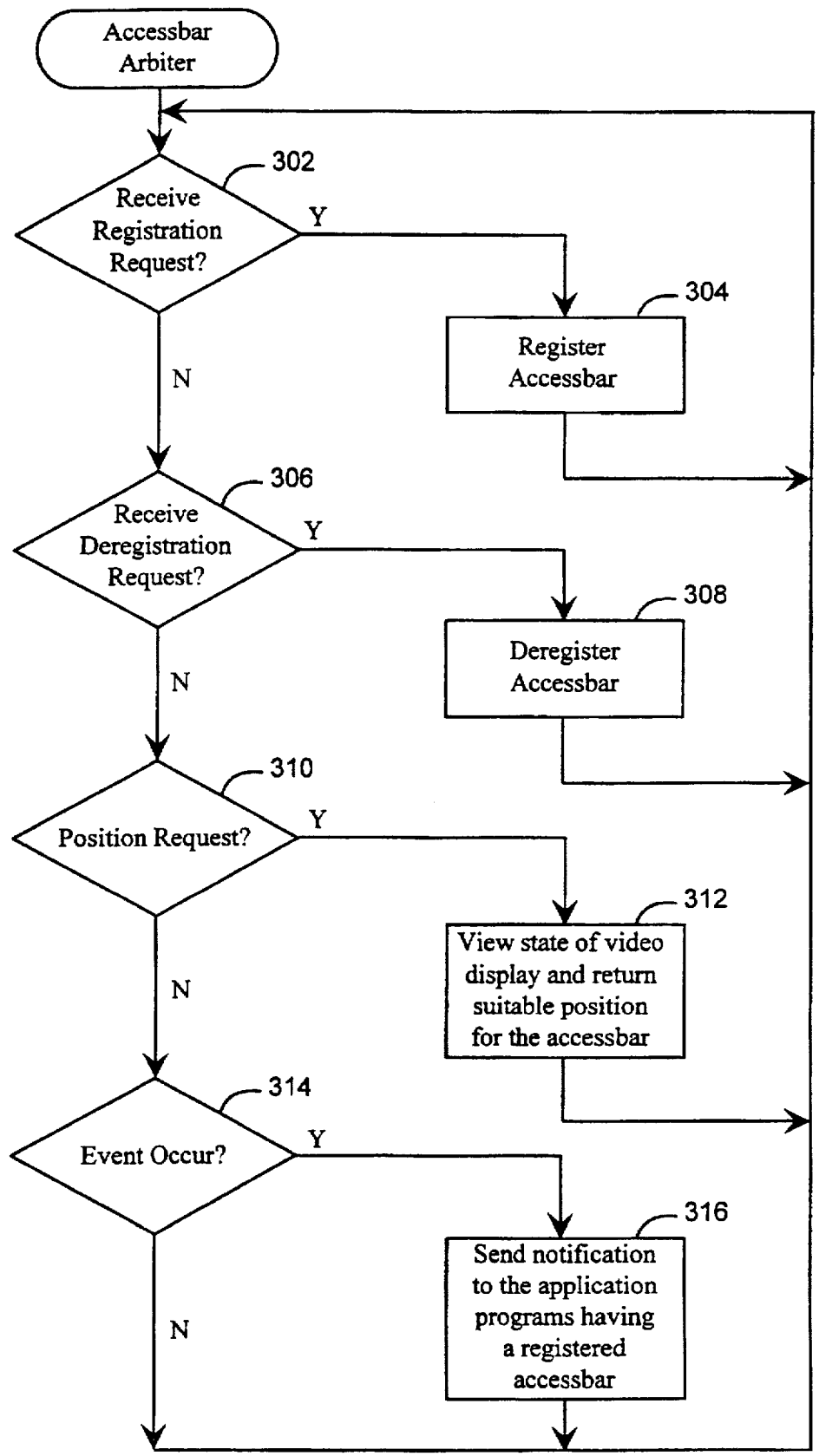
FIG. 3 depicts a flowchart of a functional overview of the accessbar arbiter of the preferred embodiment of the present invention.

FIG. 3 depicts a flowchart of a functional overview of the accessbar arbiter of the preferred embodiment. During its processing, the accessbar arbiter may receive registration requests, deregistration requests, and position requests from application programs having an accessbar. In addition, the accessbar arbiter detects if an event has occurred that may affect the processing of the accessbars displayed on the video display. The first step performed by the accessbar arbiter is to determine if it received a registration request (step 302). If the accessbar arbiter received a registration request, the accessbar arbiter registers the accessbar by storing information pertaining to the accessbar (step 304). This information is further described below. If the accessbar arbiter did not receive a registration request, the accessbar arbiter determines if it received a deregistration request (step 306). In this case, the accessbar arbiter deregisters the accessbar by deleting the stored information (step 308). Upon registering an accessbar with the accessbar arbiter, an application program can make a request for a position for the accessbar on the video display. Thus, the accessbar arbiter may receive a position request (step 310). The accessbar arbiter, after receiving the position request, views the state of the video display, determines if there are any other accessbars currently displayed at the requested position and returns a response to the application program containing a suitable position for the accessbar (step 312). The accessbar arbiter, in performing this processing, provides preferential treatment to the taskbar. That is, in the preferred embodiment, the taskbar does not request a position from the accessbar arbiter. Instead, the taskbar merely moves to the position that it prefers and the accessbar arbiter ensures that all other accessbars accommodate the preferences of the taskbar. It should be appreciated that another embodiment of the present invention could have the taskbar communicate with the accessbar arbiter.

In addition to the functionality described above, the accessbar arbiter detects if an event has occurred that may affect the functionality of the accessbars displayed on the video display (step 314). Such events include when a full screen application has taken control of the video display, when an accessbar anchored on the same side as the application program's accessbar has been moved or repositioned, or when an accessbar anchored on the same side as the application program's accessbar has become autohidden. If such an event occurs, the accessbar arbiter sends a notification to the application programs having a registered accessbar that indicates the event that occurred (step 316). Notifications are discussed in more detail below.

Figure 4A:
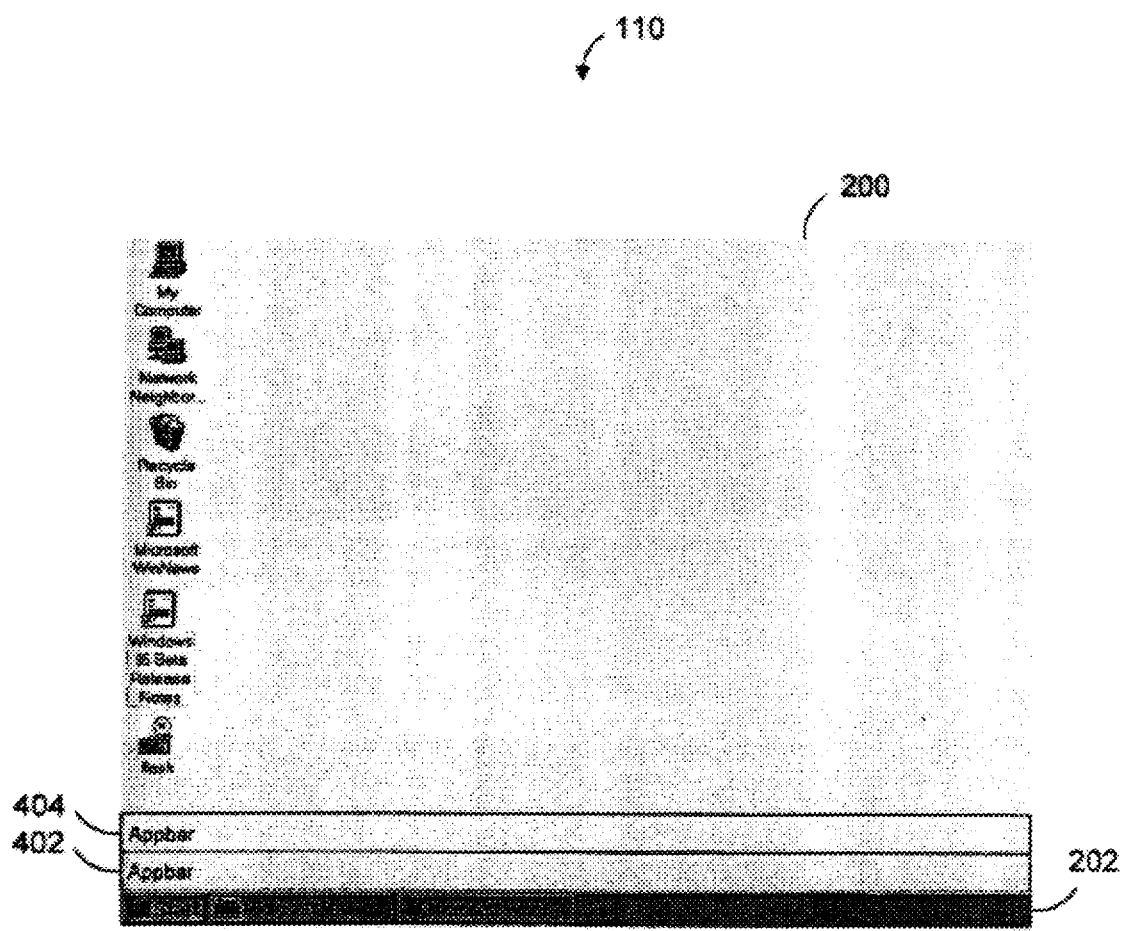
FIG. 4A depicts the state of the video display of the computer system of FIG. 1 containing a taskbar and two appbars.
Figure 4B:
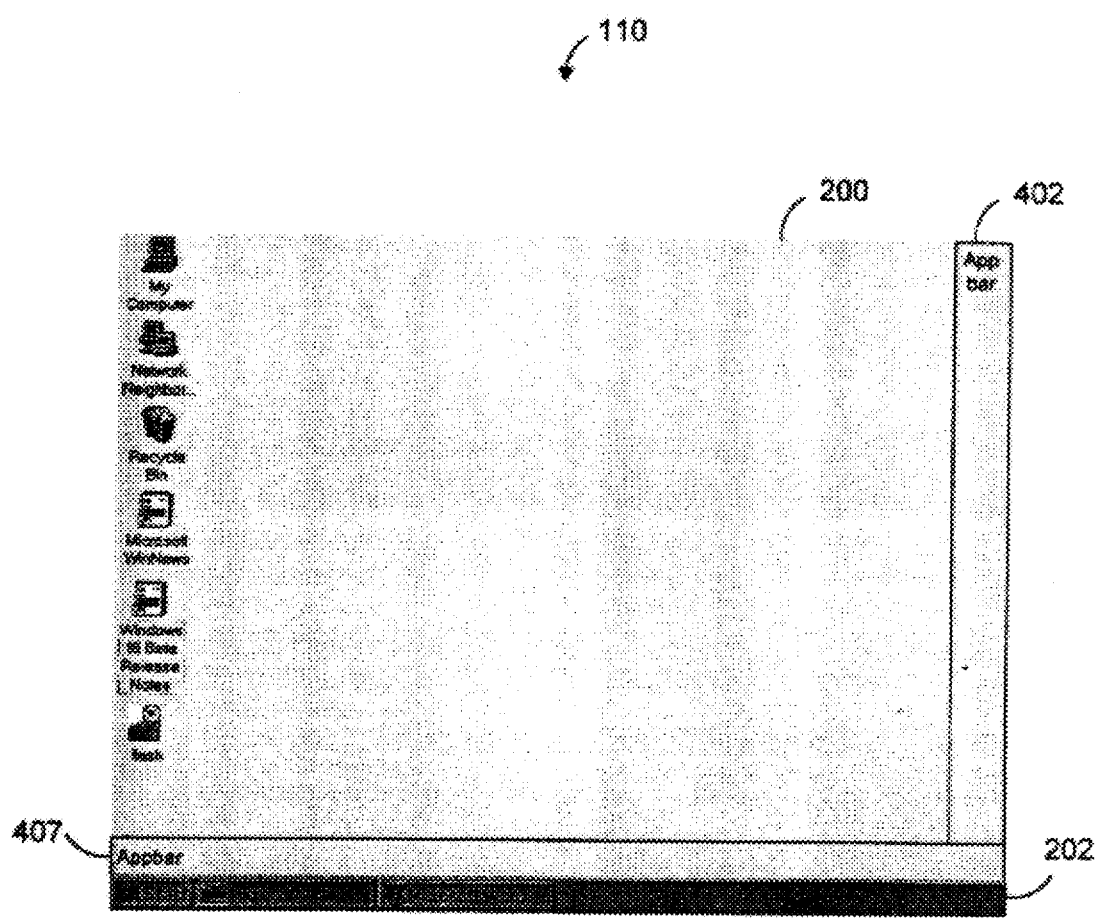
FIG. 4B depicts the state of the video display after one of the appbars of FIG. 4A has been moved from the bottom edge of the video display to the righthand side edge of the video display.

To illustrate the need for notifications, consider FIG. 4A, which depicts three accessbars on the video display 110. One of the accessbars is the taskbar 202 and two of the accessbars are appbars 402, 404. If appbar 402 were moved to another edge of the video display, the application program displaying appbar 404 needs to be notified so that it can reposition the appbar closer to the taskbar 202. Otherwise, the area previously occupied by the appbar 402 would become unusable space on the video display 110. FIG. 4B depicts the state of the video display 110 after appbar 402 has been moved to the right-hand edge of the video display in accordance with the preferred embodiment of the present invention. In the preferred embodiment, the application program displaying appbar 404 is notified by the accessbar arbiter of the movement of appbar 402 and in response, the application program repositions the appbar 404 to prevent any wasted space on the video display 110.

Figure 4C:
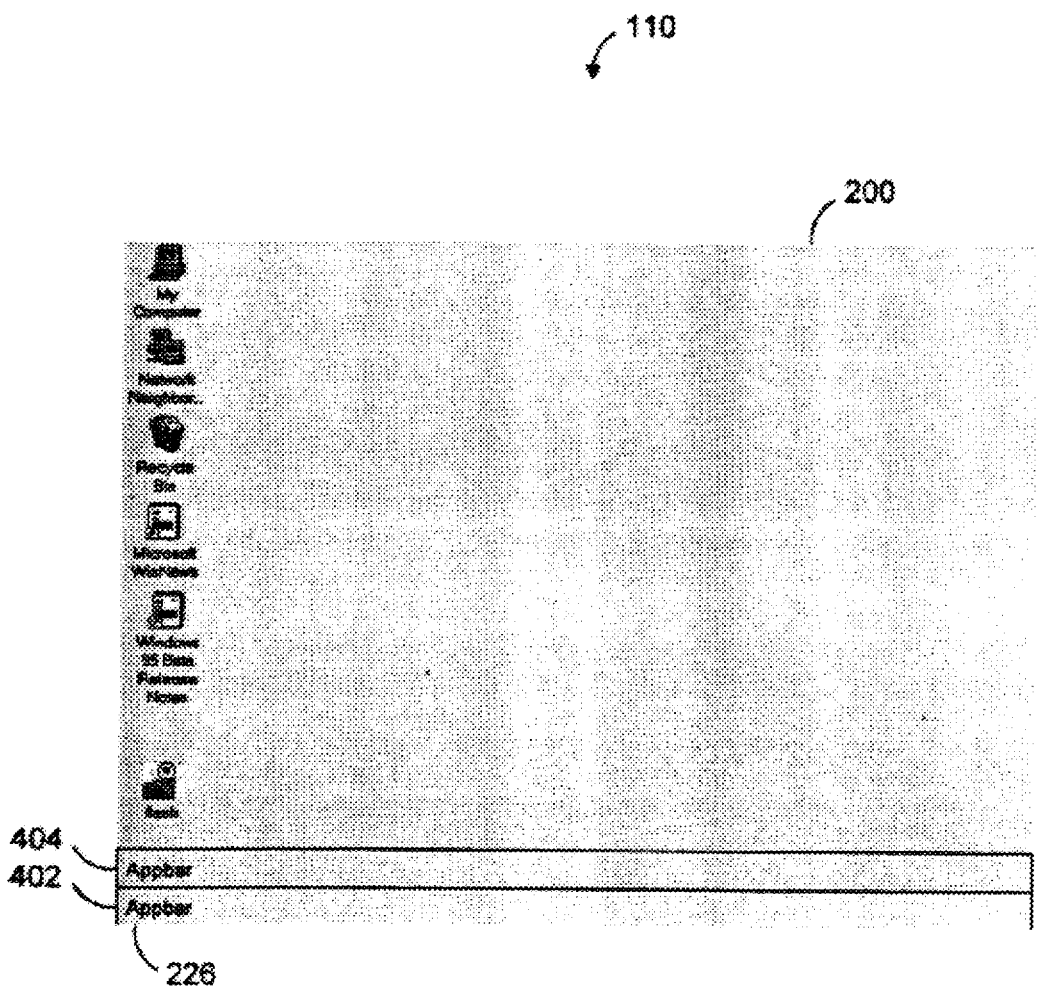
FIG. 4C depicts the state of the video display after the taskbar of FIG. 4A has been placed in autohide mode.

Another example, referring back to FIG. 4A, is if the taskbar 202 were placed in autohide mode. If the appbar 402 and 404 were not notified, the area of the video display that was previously used for displaying the taskbar 202 Would become unusable space. FIG. 4C depicts the state of the video display 110 after the taskbar 202 has been placed in autohide mode in accordance with the preferred embodiment. The application programs that display the appbars 402, 404 have been notified by the accessbar arbiter of the taskbar 202 being placed in autohide mode. In response, the application programs have repositioned the appbars 402, 404 to prevent any area of the video display 110 from becoming unused (i.e., closer to the bottom edge of the video display).

In order for application programs to interface with the accessbar arbiter, the accessbar arbiter provides an application program interface (API) 119. This API is facilitated by sending messages between an application program that displays an accessbar and the accessbar arbiter, and by sending notifications from the accessbar arbiter to the application programs having a registered accessbar.

This message and notification sending is performed by the SHAppBarMessage function that is provided by the operating system. One parameter of the SHAppbarMessage function is an identifier of the message or notification being transferred. This parameter contains information pertaining to both messages and notifications. Another parameter is the AppBarData structure, which is depicted in code Table No. 1.

CODE TABLE 1

```
typedef struc_AppBarData
    DWORD    cbSize;
    HWND     hWnd;
    UINT     uCallbackMessage;
    UINT     uEdge;
    RECT     rc;
    LPARAM   LParam;
} APPBARDATA, *PAPPBARDATA;
```

The "cbSize" element of the AppBarData structure refers to the size of the AppBarData structure. The "hWnd" element of the AppBarData structure is the window handle of the accessbar, which is a reference to the window that displays the accessbar. The "uCallbaekMessage" element of the AppBarData structure is an identifier that the application program specifies and that is returned to the application program when the accessbar arbiter sends a notification to the application program. The "uEdge" element refers to one of the edges of the video display, including bottom, left, right, and top. The "rc" parameter contains the bounding rectangle, specified in screen coordinates, of an accessbar. The bounding rectangle specifies the perimeter or boundary of the accessbar. The use of the "LParam" element depends upon the particular message and is discussed below.

As previously stated, the SHAppBarMessage function has a parameter that specifies the message or notification being transferred. These messages fall into various categories that include: accessbar registration, accessbar position, autohide accessbars and taskbar information. The messages, according to these categories, are depicted below in Table No. 2. These messages and notifications will be described in more detail below.

TABLE NO. 2

| Accessbar Registration |
|---|
| ABM_NEW |
| ABM_REMOVE |
| Accessbar Position |
| Messages |
| ABM_ACTIVATE |
| ABM_QUERYPOS |
| ABM_SETPOS |
| ABM_WINDOWPOSCHANGED |
| Notifications |
| ABN_FULLSCREENAPP |
| ABN_POSCHANGED |
| ABN_WINDOWARRANGE |
| Auto-Hide Accessbars |
| ABM_GETAUTOHIDEBAR |
| ABM_SETAUTOHIDEBAR |
| Taskbar Information |
| Messages |
| ABM_GETSTATE |
| ABM_GETTASKBARPOS |
| Notification |
| ABN_STATECHANGE |

The ABM_NEW message is sent from the application program to the accessbar arbiter to register an accessbar and to specify the message identifier that the accessbar arbiter should use when sending notification messages to the accessbar. After receiving this message, the accessbar arbiter stores the data found in the AppBarData structure into a list that it maintains for all registered accessbars. The ABM$_{13}$ REMOVE message is sent by the application program to indicate to the accessbar arbiter that it no longer wishes to receive notifications or perform processing associated with an accessbar. In response to receiving this message, the accessbar arbiter removes the information relating to the indicated accessbar from its internal list.

The ABM_ACTIVATE message is sent by the application program to the accessbar arbiter in response to receiving the WM_ACTIVATE message from the operating system. A WM_ACTIVATE message is received by the application program from the operating system when a user has activated (e.g., clicked on) the window of the application program. The ABM_QUERYPOS message is sent by the application program to the accessbar arbiter to request a proposed location for an accessbar on the video display. The request is made in terms of a bounding rectangle. Upon receiving the message, the accessbar arbiter determines whether another accessbar currently occupies any portion of the bounding rectangle and, if so, the accessbar arbiter reduces the bounding rectangle accordingly. After completion, the ABM_QUERYPOS message passes the, possibly reduced, bounding rectangle to the application program. The application program then determines whether the returned bounding rectangle is sufficient for the needs of the application program. If the bounding rectangle is insufficient, the application program can increase the size of the bounding rectangle in a direction toward the center of the video display. That is, if the application program is attempting to place an accessbar on the left-hand side of the video display and one-half of the width of the bounding rectangle is currently occupied by the taskbar, the returned bounding rectangle will be returned accordingly. The application program can then increase the width of the bounding rectangle to a width that is acceptable. When increasing the width of the bounding rectangle, the increase in width occurs in a direction toward the center of the video display (e.g., to the right) and away from edge of the display, since the area toward the edge of the display is occupied and, hence, unavailable.

The ABM_SETPOS message is used by the application program to indicate to the accessbar arbiter the location where the application program will place the accessbar. Upon receiving the ABM_SETPOS message, the accessbar arbiter has an opportunity to again modify the bounding rectangle. The accessbar arbiter may adjust the bounding rectangle so that the accessbar does not interfere with the taskbar or any other appbar. The ABM_WINDOWPOSCHANGED message is sent by the application program to the accessbar arbiter in response to receiving the WM_WINDOWPOSCHANGED message from the operating system. The WM_WINDOWPOSCHANGED message is received from the operating system when the user has moved or resized an accessbar. Thus, this message is used to notify the accessbar arbiter of a change to an accessbar so that the accessbar arbiter can notify all other application programs having a registered accessbar.

The accessbar arbiter sends various notifications to application programs relating to the accessbar position. The ABN_FULLSCREENAPP notification indicates to the application program both the invocation and the termination of a fullscreen application. That is, a notification is sent to all application programs having a registered accessbar when a fullscreen application has been invoked and another notification is sent when a fullscreen application has terminated. The LParam element of the AppBarData structure is used to distinguish between the two notifications. The ABN_POSCHANGED notification is sent to all application programs with registered accessbars when an event has occurred that may affect an accessbar's size and position. These events include changes to the taskbar's size, position and visibility state, as well as the addition, removal or resizing of another accessbar on the same edge of the display. A change to the visibility state of an accessbar refers to whether its always-on-top mode or autohide mode has changed settings. The ABN_WINDOWARRANGE notification is sent to the application programs with registered accessbars when the user has used the taskbar to rearrange the windows on the video display. That is, the taskbar can be used to rearrange windows that are currently displayed on the video display. This rearrangement can be performed so that the windows are cascaded, tiled horizontally or tiled vertically. In addition, the taskbar allows the user to minimize all windows or undo minimize all windows. When a user chooses to minimize all windows, all windows displayed on the video display are removed from the display and the button (e.g., the taskbar button) corresponding to the window appears to be deselected. When the user chooses to undo minimize all windows, all of the windows corresponding to the taskbar buttons on the taskbar become displayed on the video display. The ABN_WINDOWARRANGE notification apprises accessbars of both the rearrangement of windows as well as the minimization of windows.

With respect to autohide accessbars, the API provides the ABM_GETAUTOHIDEBAR message. The ABM_GETAUTOHIDEBAR message is sent by the application program to the accessbar arbiter to request the handle of the autohide accessbar associated with a particular edge of the video display. The ABM_SETAUTOHIDEBAR message is used by the application program to register or unregister an accessbar in autohide mode for a particular edge of the screen. The preferred embodiment allows only one autohide accessbar for each edge of the screen on a first come, first serve basis. This message returns true if successful and false if an autohide accessbar is already registered for the requested edge. In the preferred embodiment of the present invention an accessbar that is in autohide mode does not need to be registered through the ABM_NEW message. If the accessbar in autohide mode is not registered using ABM_NEW but is only registered using ABM_SETAUTOHIDEBAR, the application program of the accessbar will not receive any notifications.

With respect to taskbar information, the API supports the ABM_GETSTATE message. The ABM_GETSTATE message is sent by the application program to the accessbar arbiter to request the visibility state of the taskbar. In response, the application program returns an indication of whether the taskbar is in always-on-top mode and whether the taskbar is in autohide mode. The ABM_GETTASKBARPOS message retrieves the bounding rectangle of the taskbar from the accessbar arbiter. The ABN_STATECHANGE notification is sent by the accessbar arbiter to the application programs with a registered accessbar when the visibility state of the taskbar changes. That is, the user has changed either the always-on-top property or the autohide property.

FIGS. 5A, 5B, 5C, and 5D depict a flowchart of the steps performed by the accessbar arbiter of the preferred embodiment of the present invention. The first step performed by the accessbar arbiter is to wait until receiving an event (step 502). The accessbar arbiter is event driven and therefore performs no significant processing until receiving an event, such as either a message from an application program or an indication that something affecting the taskbar has occurred. After receiving an event, the arbiter determines if it received an ABM_NEW message (step 504). If the arbiter received an ABM_NEW message, the arbiter adds the AppBarData structure to the internal list, thereby registering the accessbar so that the application program can receive notifications (step 506). After adding the data structure to the list, processing continues to step 502 and the accessbar arbiter waits until receiving another event. If the ABM_NEW message was not received, the accessbar arbiter determines if the ABM_REMOVE message was received (step 508). If the ABM_REMOVE message was received, the accessbar arbiter removes the AppBarData structure from its internal list, thereby deregistering the accessbar (step 510). After removing the data structure, processing continues to step 502. If it is determined that the ABM_REMOVE message was not received, the accessbar arbiter determines if it received an ABM_QUERYPOS message (step 512). If the accessbar arbiter received the ABM_QUEKYPOS message, the accessbar arbiter determines if any portion of the bounding rectangle is being used by another accessbar (step 514). Then, the arbiter returns any usable portion of the bounding rectangle (step 516) and continues processing to step 502. If it is determined that the ABM_QUERYPOS message was not received, the accessbar arbiter determines if the ABM_SETPOS message was received (step 518 in FIG. 5B).

If the accessbar arbiter received the ABM_SETPOS message, the accessbar arbiter determines if any portion of the bounding rectangle is being used by another accessbar including the taskbar (step 520). The arbiter then shrinks the work area of the video display (step 522). In this step, the arbiter indicates to the operating system that the portion of the screen within the bounding rectangle is no longer to be used for displaying windows and all screen objects within the bounding rectangle are moved toward the center of the video display so as to be accessible after the accessbar has been displayed.. After shrinking the work area, the accessbar arbiter broadcasts the ABN_POSCHANGED notification to all application programs having an accessbar that is registered with the arbiter (step 524). After the broadcast, the accessbar arbiter continues to step 502. If it is determined that the ABM_SETPOS message has not been received, the accessbar arbiter determines if an ABM_WINDOWPOSCHANGED message has been received (step 526). If the ABM_WINDOWPOSCHANGED message has been received, the accessbar arbiter broadcasts the ABN_POSCHANGED notification to all application programs having an accessbar that is registered with the arbiter (step 528) and continues to step 502. If the ABM_WINDOWPOSCHANGED message has not been received, the accessbar arbiter determines if the ABM_GETAUTOHIDEBAR message has been received (step 530). If the ABM_GETAUTOHIDEBAR message has been received, the accessbar arbiter returns the window handle of the autohide accessbar on the specified side of the video display (step 532) and continues to step 502. If the arbiter determines that the ABM_GETAUTOHIDEBAR message was not received, the arbiter determines if the ABM_SETAUTOHIDEBAR message has been received (step 534). If the ABM_SETAUTOHIDEBAR message has been received, the accessbar arbiter determines if there is already an accessbar in autohide mode on the specified side and rejects the request if there is such an accessbar. Otherwise, the arbiter allows the request if there is no autohide accessbar on the specified side (step 536). Processing then continues to step 502.

Figure 5A:
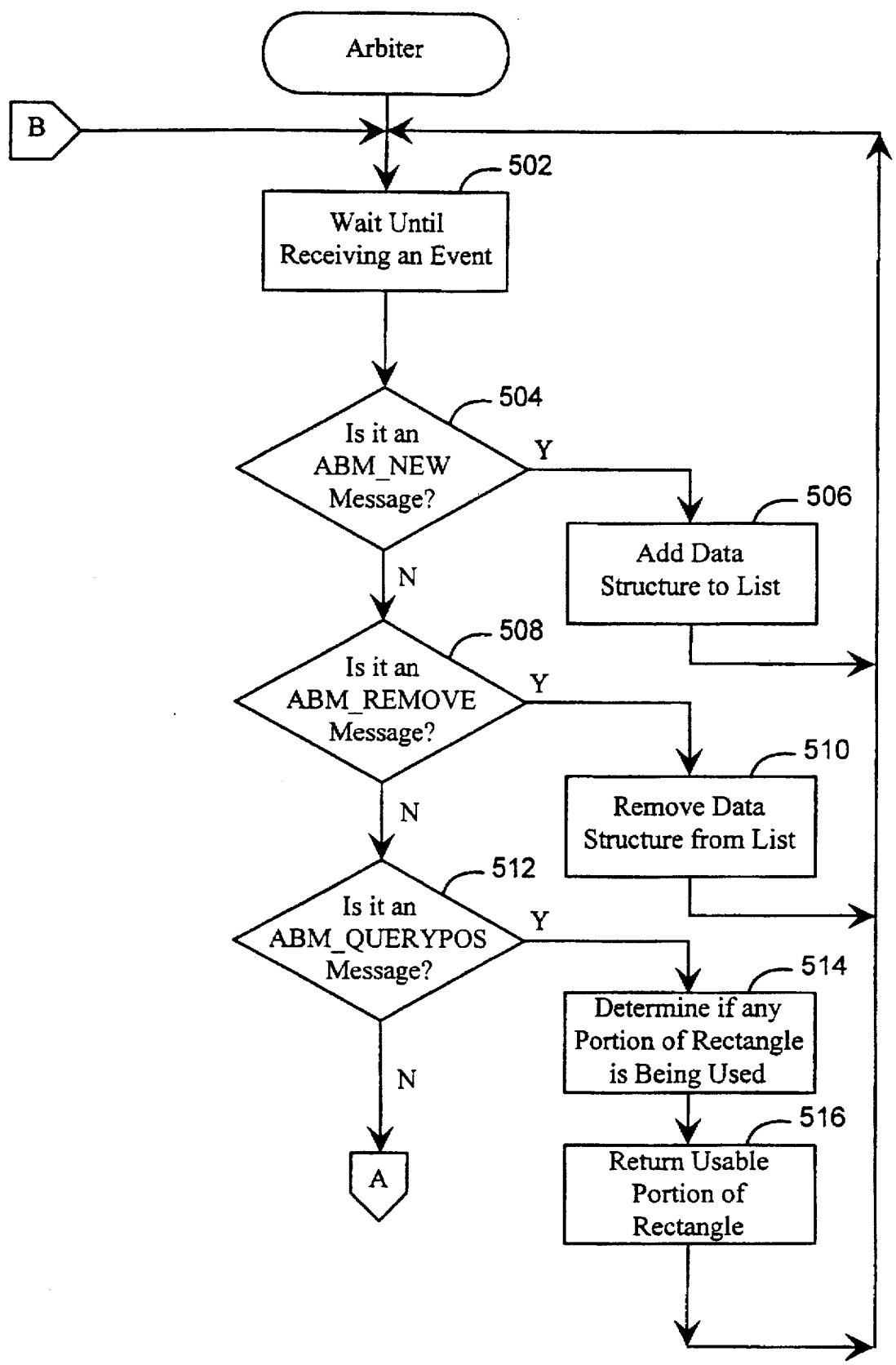
FIGS. 5A, 5B, 5C, and 5D depict a flowchart of the steps performed by the accessbar arbiter of the preferred embodiment of the present invention.
Figure 5B:
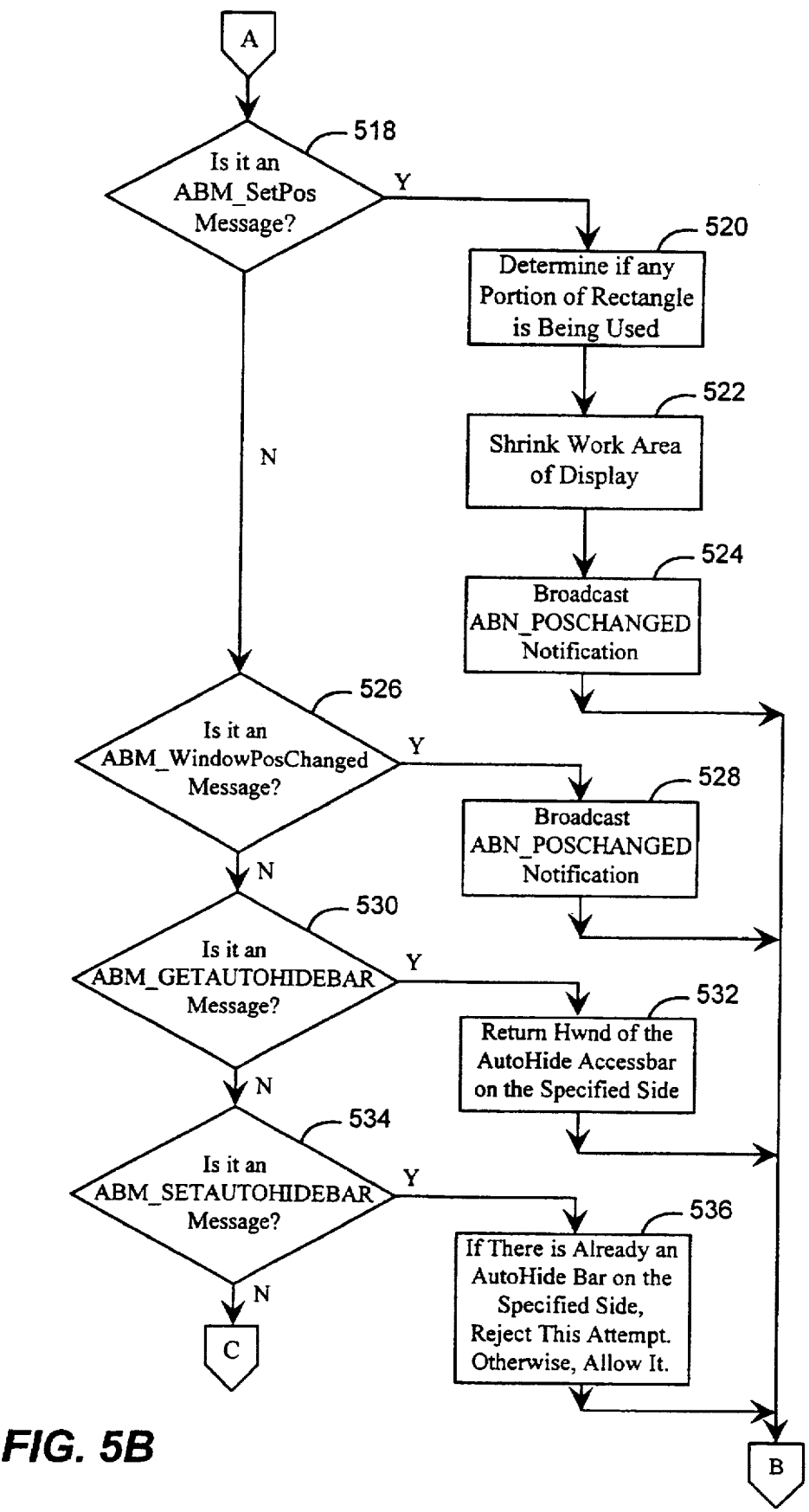
Figure 5C:
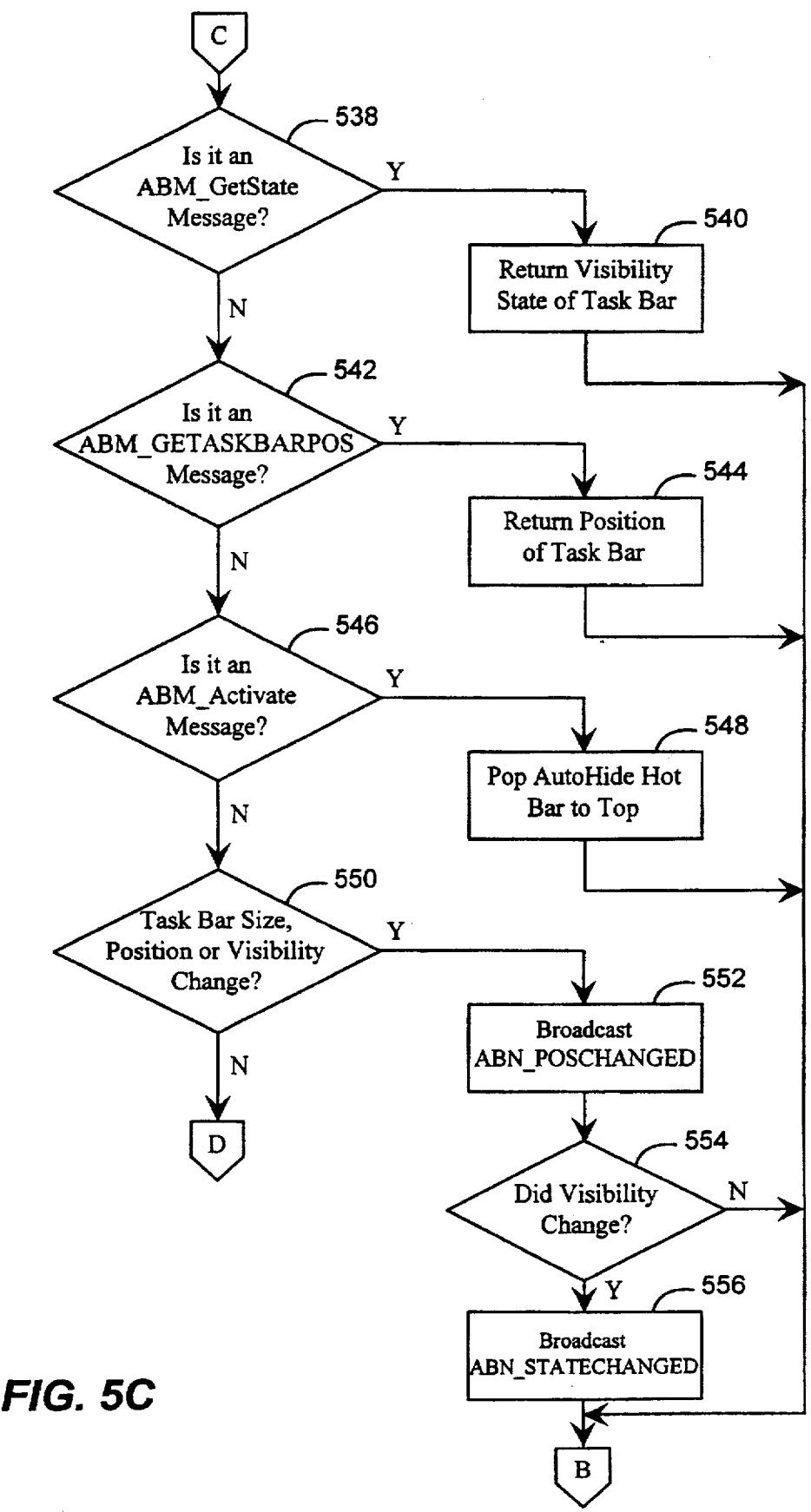

If the accessbar arbiter has not received the ABM_SETAUTOHIDEBAR message, the accessbar arbiter determines if the ABM_GETSTATE message has been received (step 538 in FIG. 5C). If the ABM_GETSTATE message has been received, the accessbar arbiter returns the visibility state of the taskbar (step 540). In this step, the accessbar arbiter maintains an indication of the visibility state of the taskbar and returns an indication of whether the taskbar is in always-on-top mode or is in autohide mode. Processing then continues to step 502. If the accessbar arbiter has not received the ABM_GETSTATE message, the accessbar arbiter determines if it has received the ABM_GETTASKBARPOS message (step 542). If the accessbar arbiter has received the ABM_GETTASKBARPOS message, the accessbar arbiter returns the current position of the taskbar (step 544). In this step, since the taskbar and the accessbar arbiter of the preferred embodiment are implemented within the operating system, the accessbar arbiter has access to the position of the taskbar and thus the accessbar arbiter returns the bounding rectangle of the taskbar in terms of Cartesian coordinates. Processing then continues to step 502.

If the accessbar arbiter has not received the ABM_GETTASKBARPOS message, the accessbar arbiter determines if it received the ABM_ACTIVATE message (step 546). If the accessbar arbiter received the ABM_ACTIVATE message, the accessbar arbiter pops any autohide hotbars currently displayed to the top of the Z order (step 548). The accessbar arbiter performs this processing so as to ensure that the user will always have access to the hotbars, otherwise the autohide accessbars would be rendered inaccessible. The accessbar arbiter pops the hotbars to the top of the Z order by making a request to the operating system. Processing then continues to step 502. If the ABM_ACTIVATE message has not been received, the accessbar arbiter determines whether the taskbar's size, position, or visibility state has changed (step 550). Again, the accessbar arbiter has knowledge of the changes to the taskbar, since the accessbar arbiter of the preferred embodiment is implemented as part of the operating system. If the taskbar's size, position, or visibility state has changed, the accessbar arbiter broadcasts the ABN_POSCHANGED notification to all application programs having an accessbar registered with it (step 552). After the broadcast, the accessbar arbiter determines if the visibility state of the taskbar has changed (step 554). If the visibility state of the taskbar has not changed, processing continues to step 502. However, if the visibility state of the taskbar has changed, the accessbar arbiter broadcasts the ABN_STATECHANGED notification (step 556) and continues to step 502.

Figure 5D:
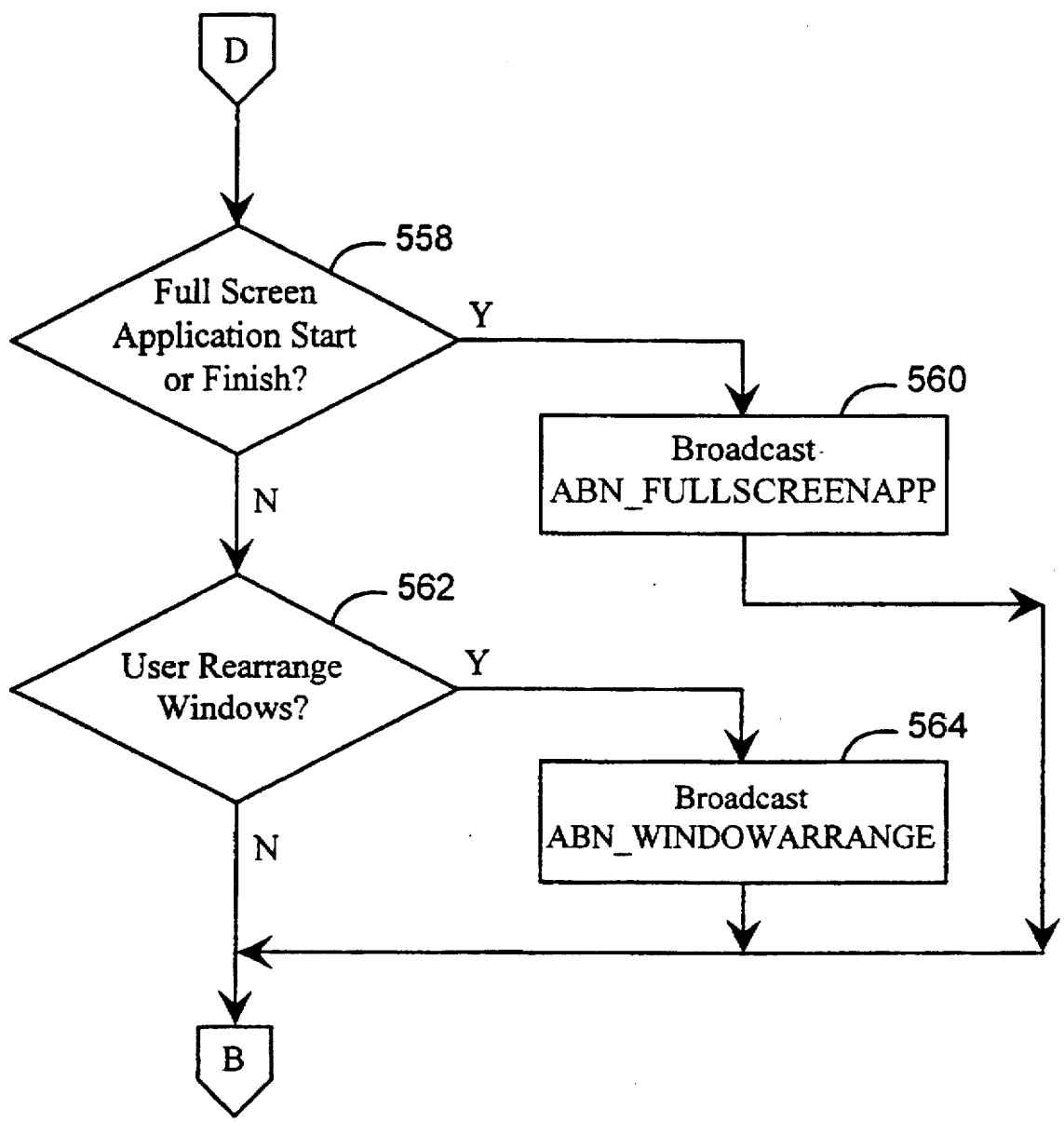

If the taskbar size, position, or visibility state has not changed, the accessbar arbiter determines if a fullscreen application has started or finished (step 558 in FIG. 5D). If a fullscreen application has either started or finished, the accessbar arbiter broadcasts the ABN_FULLSCREENAPP notification to all application programs having a registered accessbar indicating whether the fullscreen application program has started or terminated (step 560). The ABM_FULLSCREENAPP notification is sent to application programs so that accessbars can drop in the Z order to be below the fullscreen application and then restore themselves to the top of the Z order when the fullscreen application has terminated. This allows a fullscreen application to take total control of the video display. Processing then continues to step 502. If a fullscreen application has not either started or finished, the accessbar arbiter determines whether a user has rearranged the windows on the video display (step 562). If the user has rearranged the windows, the accessbar arbiter broadcasts the ABN_WINDOWARRANGE notification (step 564) and continues to step 502. The ABN_WINDOWARRANGE notification is sent so that all accessbars can be closed during the rearrangement and then opened afterwards so that the accessbars are unaffected by the rearrangement of the windows. Since the accessbars themselves are windows, if this were not done, the accessbars would also be rearranged. If the user has not rearranged the windows, processing continues to step 502.

Figure 6A:
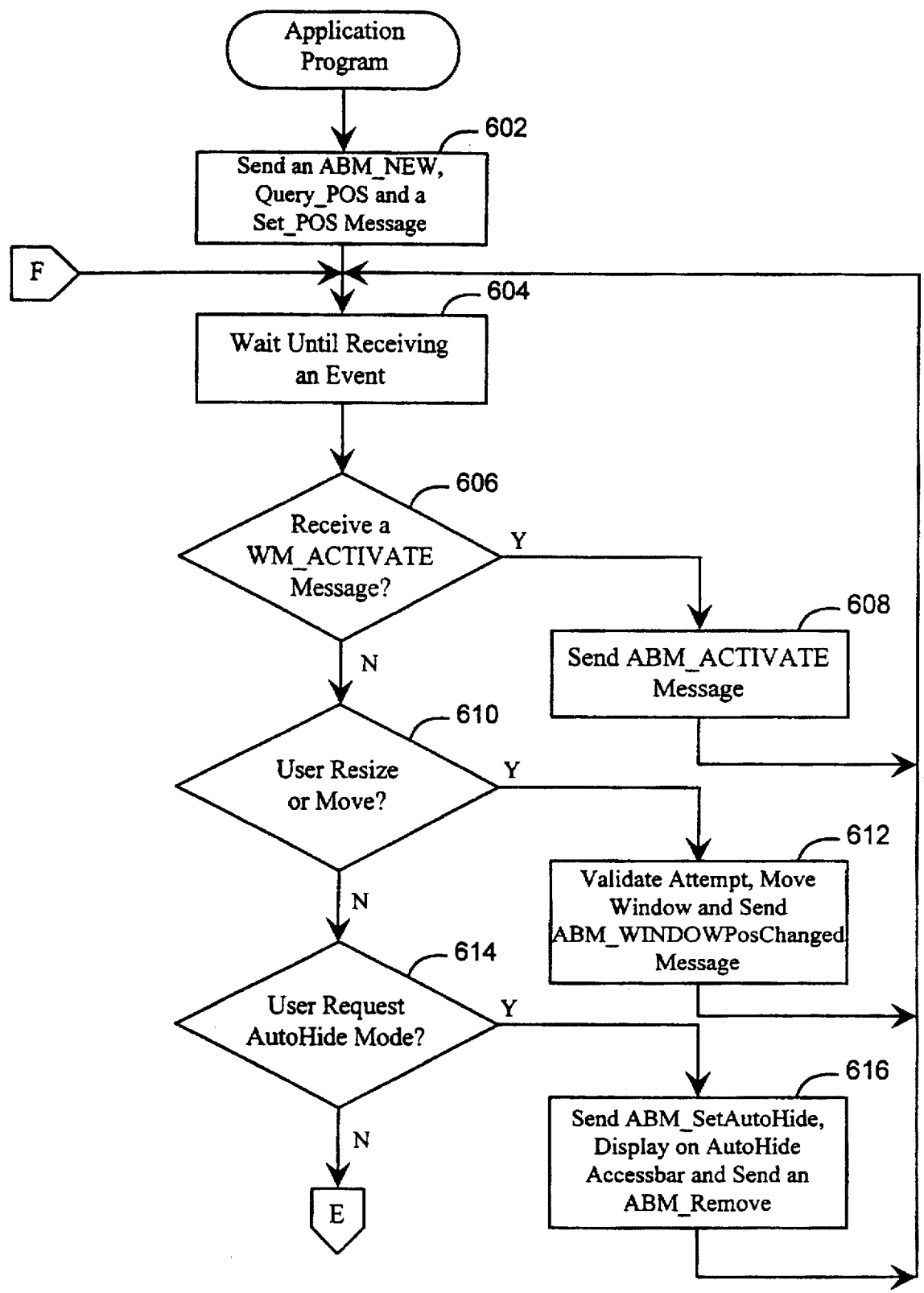
FIGS. 6A, 6B, and 6C depict a flowchart of the steps performed by an application program utilizing the accessbar arbiter of the preferred embodiment of the present invention.
Figure 6B:
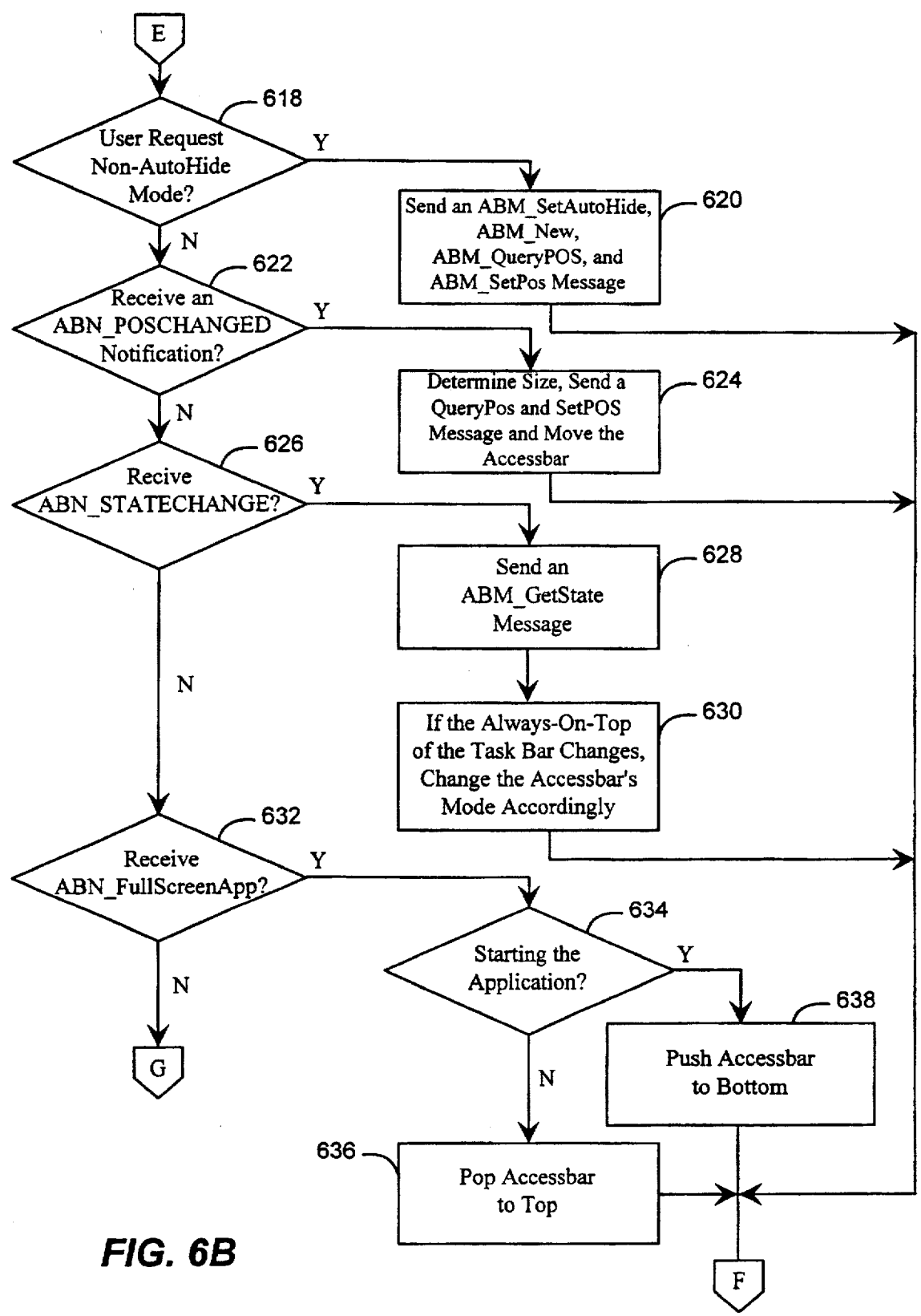
Figure 6C:
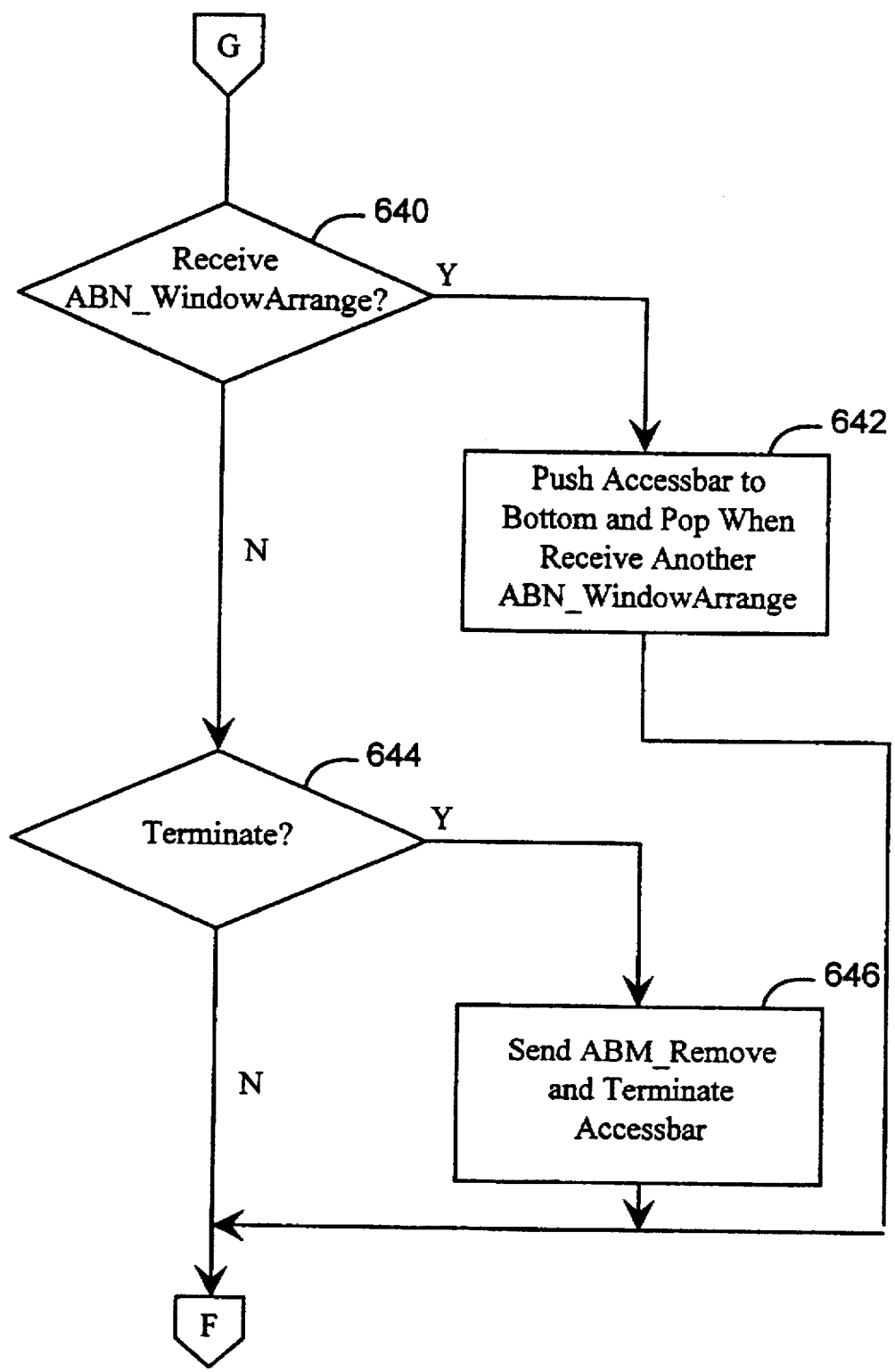

FIGS. 6A, 6B, and 6C depict a flowchart of the steps performed by an example application program when utilizing the accessbar arbiter in accordance with the preferred embodiment of the present invention. In order to initially display the accessbar, the application program sends an ABM_NEW message to register the accessbar, an ABM_QUERYPOS message to determine a location for the accessbar, and an ABM_SETPOS message to the accessbar arbiter to indicate where the accessbar will be displayed (step 602). After the ABM_SETPOS message has returned, the application program displays the accessbar at the bounding rectangle that is returned by the accessbar arbiter. In order to display the accessbar, the application uses well-known functions provided by the operating system. After displaying the accessbar, the application program waits until receiving an event (step 604). The application program can receive either a message from the operating system indicating user input or a notification from the accessbar arbiter. Upon receiving an event, the application program determines whether it received a WM_ACTIVATE message indicating that the user has activated the application program (step 606). If the application program received a WM_ACTIVATE message, the application program sends an ABM_ACTIVATE message to the accessbar arbiter (step 608) and continues to step 604 to wait for another event. Sending the ABM_ACTIVATE message to the accessbar arbiter will cause the arbiter to pop all autohide hotbars to the top of the Z order.

If the application program did not receive the WM_ACTIVATE message, the application program determines whether the user has resized or moved the window (step 610). The application program receives a number of messages from the operating system during a resizing or moving of the accessbar. The processing described herein is exemplary of one scheme that would work with the preferred embodiment of the present invention, although others may be used. During a resize operation, one of the messages sent by the operating system is the WM_SIZE message. This message indicates that the user is currently resizing the accessbar and provides the bounding rectangle to the application program. The application program can use this bounding rectangle for validation purposes and reject the resize request if the bounding . rectangle violates any of the rules of the application program. If the application program decides to allow the resizing of the accessbar, the application program should first determine the size of the accessbar by invoking the well-known SetWindowRect function of the operating system. Next, the application program sends an ABM_QUERYPOS message and an ABM_SETPOS message and then moves the accessbar to the returned bounding rectangle. Then, after the resize operation has completed, the operating system sends a WM_WINDOWPOSCHANGED message to the application program. At this point, the application program sends the ABM_WINDOWPOSCHANGED message to the accessbar arbiter so that the arbiter can notify all other accessbars. If the attempted operation is a move operation, the processing performed by the application program is similar. However, the message received when the move is being performed is the WM_MOVE message. Similar to the resize operation, the WM_WINDOWPOSCHANGED message is also sent to the application program if the move is allowed to occur. In summary, when the user attempts to resize or move the accessbar, the application program validates the attempt, moves the accessbar and sends the ABM_WINDOWPOSCHANGED message (step 612). Processing then continues to step 604.

If the user did not attempt to resize or move the accessbar, the application program determines if the user has requested that the accessbar be put into autohide mode (step 614). If the user requested autohide mode, the application program sends the ABM_SETAUTOHIDE message to the accessbar arbiter, creates an autohide accessbar and sends an ABM_REMOVE message to the accessbar arbiter (step 616). In this step, the application program requests that the accessbar become an autohide accessbar by sending the ABM_SETAUTOHIDE message, displays an autohide accessbar by displaying the autohide hotbar, and then deregisters the accessbar since the accessbar no longer needs to receive notifications. If the user did not request that the accessbar be placed in autohide mode, the application program determines if the user needs to place the accessbar in non-autohide mode (step 618 in FIG. 6B). If the user requested non-autohide mode, the application program sends an ABM_SETAUTOHIDE message indicating non-autohide mode by setting the LParam element of the AppBarData structure accordingly, sends an ABM_NEW message to register the accessbar, sends an ABM_QUERYPOS message to determine a suitable location, and sends an ABM_SETPOS message to tell the accessbar arbiter where the accessbar will be displayed (step 620). Processing then continues to step 604.

If the user did not request non-autohide mode, the application program determines whether it received an ABN_POSCHANGED notification (step 622). If the application program received an ABN_POSCHANGED notification, the application program sends an ABM_QUEKYPOS message, ABM_SETPOS message, and then moves the accessbar to the returned bounding rectangle (step 624). These steps are performed because another accessbar may have moved, resized or repositioned itself on the edge where the accessbar is currently located and therefore the accessbar needs to update its position. Processing then continues to step 604. If the application program did not receive an ABN_POSCHANGED notification, the application program determines whether it received an ABN_STATECHANGE notification (step 626). If the application program received an ABN_STATECHANGE notification, the application program sends an ABM_GETSTATE message (step 628) to determine the visibility state of the taskbar. After receiving the visibility state of the taskbar, the application program determines if the always-on-top mode of the taskbar has changed and, if so, the application program changes the accessbar's always-on-top mode accordingly (step 630). The application program maintains the accessbar's always-on-top-mode the same as the taskbar's always-on-top mode to keep all accessbars on the same side of the video display uniform. Processing then continues to step 604. If the application program did not receive an ABN_STATECHANGE notification, the application program determines whether it received an ABN_FULLSCREENAPP notification (step 632). If the application program received an ABN_FULLSCREENAPP notification, the application program determines whether the notification indicates that the fullscreen application is being started (step 634). This indication is found in the LParam element of the AppBarData structure. If the fullscreen application program is being started, the application program pushes the accessbar to the bottom of the Z order (step 632). If the fullscreen application is being terminated, the application program pops the accessbar to the top of the Z order (step 636). After either popping the accessbar or pushing the accessbar, processing continues to step 604.

If the application program did not receive the ABN_FULLSCREENAPP notification, the application program determines whether it received the ABN_WINDOWARRANGE notification (step 640 in FIG. 6C). If the application program received the ABN_

WINDOWARRANGE notification, the application program pushes the accessbar to the bottom of the Z order and pops the accessbar when it receives a second ABN_WINDOWARRANGE notification (step 642). In this step, the accessbar arbiter sends an ABN_WINDOWARRANGE notification both before the windows are arranged and after the windows are arranged. The application program, thus, pushes the accessbar to the bottom of the Z order before the windows are arranged and pops the accessbar to the top of the Z order after the windows have been arranged so that the accessbar is not affected by the rearrangement of the windows. That is, for the proper operation of the accessbar, the accessbar should not be cascaded or arranged vertically or horizontally like the other windows on the video display. Processing then continues to step 604. If the application program determines that it has not received the ABN_WINDOWARRANGE notification, the application program determines whether the user has entered input requesting the application program terminate the accessbar (step 644). In this case, the application program receives a WM_DESTROY message from the operating system. If the WM_DESTROY message is received, the application program sends the ABM_REMOVE message to the arbiter and terminates the accessbar by terminating the window (step 646). Processing then continues to step 604. If the application program determines that it has not received the WM_DESTROY message, processing continues to step 604.

While the present invention has been described with reference to a preferred embodiment thereof, those skilled in the art will know of various changes in form that may be made without departing from the spirit and scope of the claimed invention as defined in the appended claims. For example, the present invention may be practiced with types of accessbars that differ from those depicted in the figures. More generally, the present invention may be practiced to arbitrate among types of screen objects other than accessbars.

I claim:

1. In a computer system having screen objects, a video display for displaying the screen objects, a computer program for causing the video display to display a managed one of the screen objects that is managed by the computer program, and an arbiter for arbitrating requests for locations on the video display to display the screen objects based on a criteria, a method performed by the computer program comprising the steps of:

sending a request to the arbiter for a proposed location on the video display for the managed screen object;

receiving an indication from the arbiter indicating whether the arbiter determines to display the managed screen object at the proposed location or at an alternative location;

requesting the computer system to display the managed screen object at the proposed location on the video display when the received indication indicates that the arbiter determined to display the managed screen object at the proposed location; and requesting the computer system to display the managed screen object at the alternative location on the video display when the received indication indicates that the arbiter determined to display the managed screen object at the alternative location.

2. The method of claim 1 wherein the screen objects have attributes, wherein the method performed by the computer program further includes the steps of:

receiving a notification from the arbiter that an attribute of one of the screen objects displayed on the video display has been modified;

sending a request to the arbiter for a new location on the video display for the managed screen object;

receiving the new location from the arbiter; and requesting the computer system to display the managed screen object at the new location on the video display.

3. The method of claim 1 wherein the computer system has additional computer programs and wherein the managed screen object is an accessbar providing user access to the additional computer programs.

4. The method of claim 1 wherein the step of requesting the computer system to display the managed screen object at the proposed location includes the step of displaying the managed screen object such that the managed screen object is initially invisible to a user and the managed screen object becomes visible to the user in response to user input via an input device.

5. The method of claim 1 wherein the step of requesting the computer system to display the managed screen object at the alternative location includes the step of displaying the managed screen object such that the managed screen object is initially invisible to a user and the managed screen object becomes visible to the user in response to user input via an input device.

6. The method of claim 1 wherein the request for the proposed location is sent to the arbiter as a bounding rectangle that specifies the proposed location.

7. The method of claim 1 wherein the indication received by the computer program is a bounding rectangle.

8. A data processing system, comprising:

a video display displaying a plurality of currently displayed screen objects;

a memory comprising:

an arbiter further comprising:

a first processing component that receives a first message containing an indication of a screen object and that stores the indication of the screen object creating a stored indication to register the screen object with the arbiter thereby creating a registered screen object;

a second processing component that receives a second message containing an indication of the registered screen object and that deletes the stored indication of the registered screen object to deregister the registered screen object with the arbiter; and a third processing component that receives a third message containing a request for a proposed location on the video display, that determines whether a location of at least one currently displayed screen object conflicts with the proposed location, that returns the proposed location when no conflict exists, and that returns an alternative location on the video display when a conflict exists;

a computer program having a register component that sends to the arbiter the first message to register the screen object, a request component that sends to the arbiter the third message to request a proposed location on the video display for displaying the registered screen object and for receiving an indication of a location on the computer display for displaying the registered screen object, a display component for displaying the registered screen object at the indicated location, and a deregister component that sends the second message to the arbiter to deregister the registered screen object; and a processor for running the arbiter and the computer program.

9. The data processing system of claim 8 wherein the computer program sends a fourth message containing a request for the arbiter to determine whether at least one of the currently displayed screen objects is in autohide mode such that the currently displayed screen object is initially invisible to a user and the currently displayed screen object becomes visible to the user on the video display in response to user input via an input device, and wherein the arbiter has a fourth processing component that receives the fourth message and that determines whether at least one of the currently displayed screen objects is in autohide mode.

10. The data processing system of claim 8 wherein the video display displays a window, wherein at least one of the currently displayed screen objects is in autohide mode such that the currently displayed screen object is partially visible to the user displaying only a hotbar and becomes completely visible upon user manipulation of an input device, and wherein the arbiter has a determination component that determines when a window on the video display has been activated and that adjusts the hotbar so that the hotbar is unobscured in response to the activation of the window.

11. The data processing system of claim 8 wherein the currently displayed screen objects have attributes, wherein the arbiter has a determination component for determining when an attribute of at least one currently displayed screen object has been manipulated and for sending a notification to the computer program when the determination component determines that the attribute of the at least one currently displayed screen object has been manipulated.

12. The data processing system of claim 11 wherein the manipulation of the attribute includes changing a location of the at least one currently displayed screen object.

13. The data processing system of claim 11 wherein the manipulation of the attribute includes changing a size of the at least one currently displayed screen object.

14. The data processing system of claim 11 wherein the manipulation of the attribute includes changing a visibility state of the at least one currently displayed screen object so that the at least one currently displayed screen object is displayed in always-on-top mode such that the at least one currently displayed screen object is unobscured.

15. The data processing system of claim 11 wherein the manipulation of the attribute includes changing a visibility state of the at least one currently displayed screen object so that the at least one currently displayed screen object is displayed in autohide mode such that the currently displayed screen object is initially invisible and becomes visible in response to user manipulation of an input device.

16. The data processing system of claim 8 wherein the memory contains a full-screen computer program that displays information across an entire area of the video display, wherein the arbiter has a determination component for determining when the full-screen computer program starts and for sending a notification to the computer program when the determination component determines that the full-screen computer program has started.

17. The data processing system of claim 16 wherein the determination component determines when the full-screen computer program terminates and sends a notification to the computer program when the determination component determines that the full-screen computer program has terminated.

18. The data processing system of claim 8 wherein the video display displays a plurality of windows and wherein the arbiter includes a determination component for determining when the plurality of windows have been rearranged and for sending a notification to the computer program when the determination component determines that the plurality of windows have been rearranged.

19. A computer-readable memory device that contains a data structure for use in transferring data between a computer program that displays an accessbar on a computer display of a computer system and an arbiter for arbitrating requests for locations on the computer display to display accessbars, wherein the computer program specifies a proposed location for an accessbar on the computer display in the data structure and sends the data structure to the arbiter, wherein the arbiter receives the data structure and determines if the proposed location conflicts with at least one accessbar currently displayed on the computer display, wherein when there is no conflict, the arbiter sends the data structure containing the proposed location to the computer program and wherein when there is a conflict, the arbiter sends the data structure containing an alternative location to the computer program, the data structure comprising:

a first element containing an identifier of an accessbar; and a second element containing a bounding rectangle for specifying a location on the computer display that reflects the proposed location when the computer program sends the data structure to the arbiter, that reflects the alternative location when the arbiter determines that the proposed location conflicts with the at least one accessbar currently displayed on the computer display, and that reflects the proposed location when the arbiter determines that the proposed location does not conflict with the at least one accessbar currently displayed on the computer display.

20. A computer-readable medium containing instructions for controlling a computer system having a video display for displaying screen objects, a computer program for causing the video display to display a selected one of the screen objects, and an arbiter for arbitrating requests for locations on the video display to display the screen objects based on a criteria, by performing the steps of:

receiving a request from the computer program at the arbiter containing a proposed location to display the selected screen object on the video display;

determining with the arbiter whether to display the selected screen object at the proposed location based on the criteria;

when the arbiter makes a determination to display the selected screen object at the proposed location,
causing the video display to display the selected screen object at the proposed location by the computer program; and when the arbiter makes a determination not to display the selected screen object at the proposed location,
determining with the arbiter an alternative location on the video display at which to display the selected screen object; and
causing the video display to display the selected screen object at the alternative location by the computer program.

21. The computer-readable medium of claim 20 wherein the screen objects have types, wherein screen objects of a given type have similar associated functionality, wherein the selected screen object has a first type and wherein the step of determining with the arbiter whether to display the selected screen object includes the step of determining whether a second screen object of the first type is displayed at the proposed location.

22. The computer-readable medium of claim 20 wherein the step of determining with the arbiter an alternative location includes the step of determining a next available location at which a screen object is not currently displayed in a direction toward a center of the video display.

23. The computer-readable medium of claim 20 wherein the step of causing the video display to display the selected screen object at the proposed location includes the step of displaying the selected screen object by the video display such that the selected screen object is initially invisible to a user and the selected screen object becomes visible to the user on the video display in response to user input via an input device.

24. The computer-readable medium of claim 20 wherein the step of causing the video display to display the selected screen object at the alternative location includes the step of displaying the selected screen object by the video display such that the selected screen object is initially invisible to a user and the selected screen object becomes visible to the user on the video display in response to user input via an input device.

25. The computer-readable medium of claim 20 wherein the video display displays accessbars that provide the user with access to computer programs, wherein the step of receiving a request includes the step of receiving a request for a proposed location of a first accessbar on the video display, and wherein the step of determining with the arbiter whether to display includes the step of determining whether there is a second accessbar at the proposed location.

26. A computer-readable medium containing instructions for controlling a computer system, the computer system having a video display for displaying screen objects having attributes, a plurality of computer programs, wherein each computer program causes the video display to display at least one of the screen objects, and an arbiter for arbitrating requests for locations on the video display to display the screen objects based on a criteria, by performing the steps of:

registering the screen objects by the computer programs with the arbiter to create registered screen objects that are arbitrated by the arbiter;

receiving a request by the arbiter from one of the computer programs for a proposed location of a first of the registered screen objects on the video display;

determining with the arbiter whether to display the first registered screen object at the proposed location based on the criteria;

when the arbiter makes a determination to display the first registered screen object at the proposed location,
causing the video display to display the first registered screen object at the proposed location by the one computer program;

when the arbiter makes a determination not to display the first registered screen object at the proposed location,
determining with the arbiter an alternative location on the video display at which to display the first registered screen object; and
causing the video display to display the first registered screen object at the alternative location by the one computer program;

determining with the arbiter when an attribute of a second registered screen object is modified; and when the arbiter makes a determination that an attribute of the second registered screen object has been modified, sending a notification of the modification to the computer programs that have registered screen objects.

27. A computer-readable medium containing instructions for controlling a computer system, the computer system having a video display for displaying accessbars, a first computer program for displaying a first accessbar on the video display, a second computer program for displaying a second accessbar on the video display and an arbiter for resolving conflicting requests of locations for accessbars on the video display, by performing the steps of:

displaying the first accessbar at a selected location on the video display by the first computer program;

sending a request from the second computer program to the arbiter to display the second accessbar at the selected location;

determining with the arbiter that the request conflicts with one of the accessbars displayed on the video display;

determining a suitable alternate location on the video display by the arbiter for the second accessbar;

sending the alternate location from the arbiter to the second computer program; and causing the video display to display the second accessbar at the alternate location by the second computer program.

28. A computer-readable medium containing instructions for controlling a computer system having screen objects, a video display for displaying the screen objects, a computer program for causing the video display to display a managed one of the screen objects that is managed by the computer program, and an arbiter for arbitrating requests for locations on the video display to display the screen objects based on a criteria, by performing the steps of:

sending a request to the arbiter for a proposed location on the video display for the managed screen object;

receiving an indication from the arbiter indicating whether the arbiter determines to display the managed screen object at the proposed location or at an alternative location;

requesting the computer system to display the managed screen object at the proposed location on the video display when the received indication indicates that the arbiter determined to display the managed screen object at the proposed location; and requesting the computer system to display the managed screen object at the alternative location on the video display when the received indication indicates that the arbiter determined to display the managed screen object at the alternative location.

29. The computer-readable medium of claim 28 wherein the screen objects have attributes, wherein the method performed by the computer program further includes the steps of:

receiving a notification from the arbiter that an attribute of one of the screen objects displayed on the video display has been modified;

sending a request to the arbiter for a new location on the video display for the managed screen object;

receiving the new location from the arbiter; and requesting the computer system to display the managed screen object at the new location on the video display.

30. The computer-readable medium of claim 28 wherein the computer system has additional computer programs and wherein the managed screen object is an accessbar providing user access to the additional computer programs.

31. The computer-readable medium of claim 28 wherein the step of requesting the computer system to display the managed screen object at the proposed location includes the step of displaying the managed screen object such that the managed screen object is initially invisible to a user and the managed screen object becomes visible to the user in response to user input via an input device.

32. The computer-readable medium of claim 28 wherein the request for the proposed location is sent to the arbiter as a bounding rectangle that specifies the proposed location.

* * * * *